United States Patent
Ma et al.

(10) Patent No.: US 10,843,877 B2
(45) Date of Patent: Nov. 24, 2020

(54) DISHWASHING CONVEYANCE SYSTEM AND METHOD

(71) Applicant: Dishcraft Robotics, Inc., San Carlos, CA (US)

(72) Inventors: Kevin Yuan Ma, Milpitas, CA (US); Kent Michael Anderson, Emerald Hills, CA (US)

(73) Assignee: Dishcraft Robotics, Inc., San Carlos, CA (US)

( * ) Notice: Subject to any disclaimer, the term of this patent is extended or adjusted under 35 U.S.C. 154(b) by 66 days.

(21) Appl. No.: 16/201,765

(22) Filed: Nov. 27, 2018

(65) Prior Publication Data

US 2020/0165075 A1   May 28, 2020

(51) Int. Cl.
*B65G 47/84*   (2006.01)
*A47L 15/00*   (2006.01)
(Continued)

(52) U.S. Cl.
CPC ........ *B65G 47/848* (2013.01); *A47L 15/0076* (2013.01); *A47L 15/246* (2013.01); *A47L 15/248* (2013.01); *A47L 15/34* (2013.01); *B65G 47/847* (2013.01); *B65G 47/904* (2013.01); *B65G 47/907* (2013.01); *B65G 47/915* (2013.01); *B65G 47/918* (2013.01)

(58) Field of Classification Search
CPC ........ B65G 29/00; B65G 29/02; B65G 45/10; B65G 45/22; B65G 47/847; B65G 47/848; B65G 47/904; B65G 47/907; B65G 47/915; B65G 47/918; B65G 47/92; A47L 15/0076; A47L 15/24; A47L 15/243; A47L 15/246; A47L 15/247; A47L 15/248; A47L 15/30; A47L 15/34; A47L 15/4295; B08B 3/022
See application file for complete search history.

(56) References Cited

U.S. PATENT DOCUMENTS

| 2,359,433 A | 10/1944 | McNamara |
| 3,074,550 A | 1/1963 | Moreland et al. |

(Continued)

FOREIGN PATENT DOCUMENTS

| CN | 203697019 U | 7/2014 |
| CN | 101648189 B | 9/2014 |

(Continued)

OTHER PUBLICATIONS

International Patent Application No. PCT/US2019/063457, Invitation to Pay Fees and, Where Applicable, Protest Fee, 2 pages (dated Jan. 27, 2020).

(Continued)

*Primary Examiner* — Gene O Crawford
*Assistant Examiner* — Keith R Campbell
(74) *Attorney, Agent, or Firm* — Loza & Loza, LLP

(57) ABSTRACT

A system for grasping and retaining dishware during a cleaning cycle. The system includes a grasping element and a receiving surface substantially adjacent to the grasping element. The grasping element grasps the dishware, and the receiving surface receives and retains the dishware during at least one stage of a cleaning cycle. The receiving surface rotates about an axis to convey the dishware to at least two unique locations. A corresponding method is also described herein.

18 Claims, 29 Drawing Sheets

(51) Int. Cl.
*B65G 47/90* (2006.01)
*B65G 47/91* (2006.01)
*B65G 47/86* (2006.01)
*A47L 15/24* (2006.01)
*A47L 15/34* (2006.01)

(56) References Cited

U.S. PATENT DOCUMENTS

| | | | | |
|---|---|---|---|---|
| 4,050,574 | A | * | 9/1977 | Chenevard ............... A23G 1/28 198/458 |
| 4,561,144 | A | * | 12/1985 | Marais .................. A47L 15/245 15/302 |
| 5,421,690 | A | * | 6/1995 | Litterst ................. A47L 15/247 134/126 |
| 5,464,032 | A | * | 11/1995 | Litterst ................. A47L 15/247 134/131 |
| 6,182,960 | B1 | | 2/2001 | Keller et al. |
| 2008/0257388 | A1 | * | 10/2008 | Purton ..................... B08B 1/02 134/62 |
| 2013/0247940 | A1 | | 9/2013 | Padtberg et al. |

FOREIGN PATENT DOCUMENTS

| | | | |
|---|---|---|---|
| CN | 104403938 B | 8/2016 | |
| CN | 107752957 A | 3/2018 | |
| EP | 0292773 A2 * | 11/1988 | ........... A47L 15/247 |

OTHER PUBLICATIONS

International Patent Application No. PCT/US2019/063457, International Search Report and Written Opinion, 14 pages (dated Mar. 24, 2020).

* cited by examiner

BOW-TIE CONFIGURATION

C-SHAPE CONFIGURATION

CROSS-CONFIGURATION

DISHWASHING CONVEYANCE SYSTEM AND METHOD

BACKGROUND

Field of the Invention

This invention relates to dishwashing appliances, and more particularly, to conveyance systems for dishwashing appliances.

Background of the Invention

High-volume commercial dishwashing industries tend to implement conveyor dishwashers to actively move dishware along an assembly line cleaning system. This type of cleaning system may include various cleaning zones, such as a pre-wash zone, a main wash zone, and a final rinse zone. Each zone is arranged downstream of the previous zone, and dishware is transported in a single direction through the system to encounter each dishwashing zone in a desired order.

Conveyor dishwashers typically include a conveyor belt to accommodate dishware directly, or to move dishware retained in racks through a cleaning cycle. The conveyor belt moves the dishware through successive zones and is provided with a tank that holds liquid to be sprayed in its respective zone. Since dishware is conveyed in one direction through each zone, however, it is not uncommon for spatter from liquid and debris from one zone to contaminate the next zone.

The nature of a conveyor dishwasher also requires a large footprint as dishes are moved through the cleaning process in series. Dirty dishes enter a first cleaning zone (such as a pre-wash zone), advance through successive cleaning zones (such as a main wash zone), and then finally emerge as clean dishes from a final cleaning zone (such as a final rinse zone) located a significant distance from the first cleaning zone in traditional systems. In addition, access to the surface of a dish in a conveyor dishwasher may be impeded by non-optimal orientation and packing of dishes. Neighboring dishes may obscure access to certain areas of the dish, thereby preventing effective cleaning.

Accordingly, what are needed are systems and methods to prevent contamination from liquid and debris spatter between successive dishwashing zones and to reduce the footprint traditionally associated with conveyor dishwashers. Also what are needed are systems and methods to optimally position and securely retain dishware during cleaning, thereby increasing dishwashing efficiencies and throughput by ensuring effective access to the dish surfaces. Finally what is needed are systems and methods to allow dishwashing stages or zones to operate in parallel, such that dirty dishes enter the system and clean dishes exit the system substantially simultaneously. Such systems and methods are disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Referring to FIG. 1, high-volume commercial dishwashing industries require high-throughput of dishes through multiple independent cleaning zones or stages. Such cleaning stages may include, for example, a pre-wash stage, a main wash stage, and a final rinse stage. Each stage may be arranged downstream of the previous zone, and dishware may be transported in a single direction through the system such that it encounters each dishwashing stage in a desired order.

Some features and characteristics of traditional conveyor dishwashers, however, may be inherently inefficient or otherwise disadvantageous to industry cleaning goals. For example, some dishwashing stages may spray liquid at high pressures and flow rates to remove debris from the dishware and to provide sanitization. Spatter and debris from one stage may thus inadvertently contaminate dishware in a next stage. Additionally, the single linear direction of travel for dishware to advance through multiple stages of a traditional conveyor dishwasher requires a machine having a large footprint. Finally, access to the surface of a dish in a conveyor dishwasher may be impeded by non-optimal orientation and packing of dishes. Embodiments of the present invention address these issues.

As used herein, the term "dishware" refers to any type of dish for preparing or serving food, including plates, bowls, platters, pots, pans, glasses, mugs, cups and/or any other type of tableware or cookware known to those in the art.

Figure 1A:
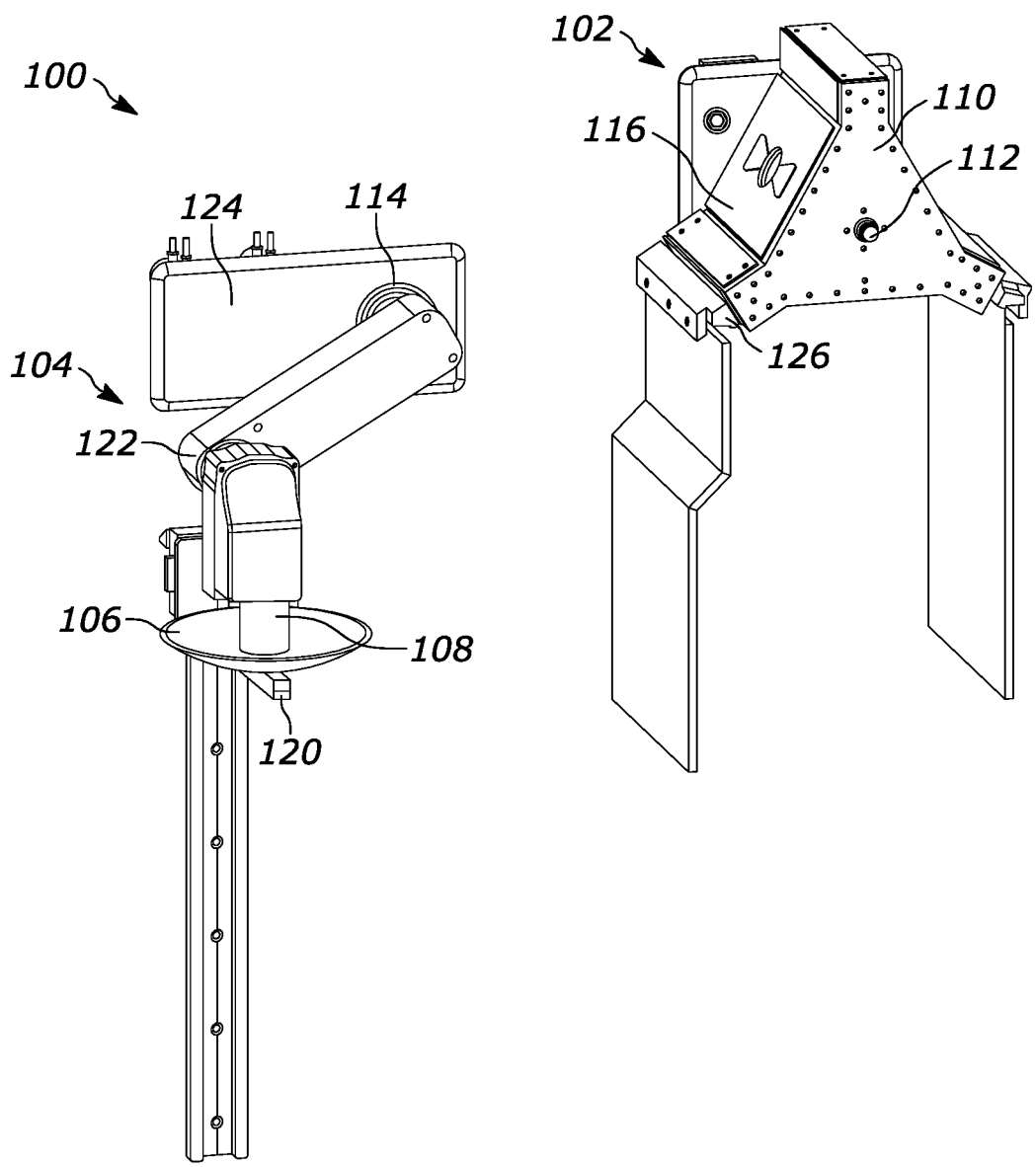
FIG. 1A is a side view of one embodiment of a system for conveying dishware in accordance with the invention.
Figure 1B:
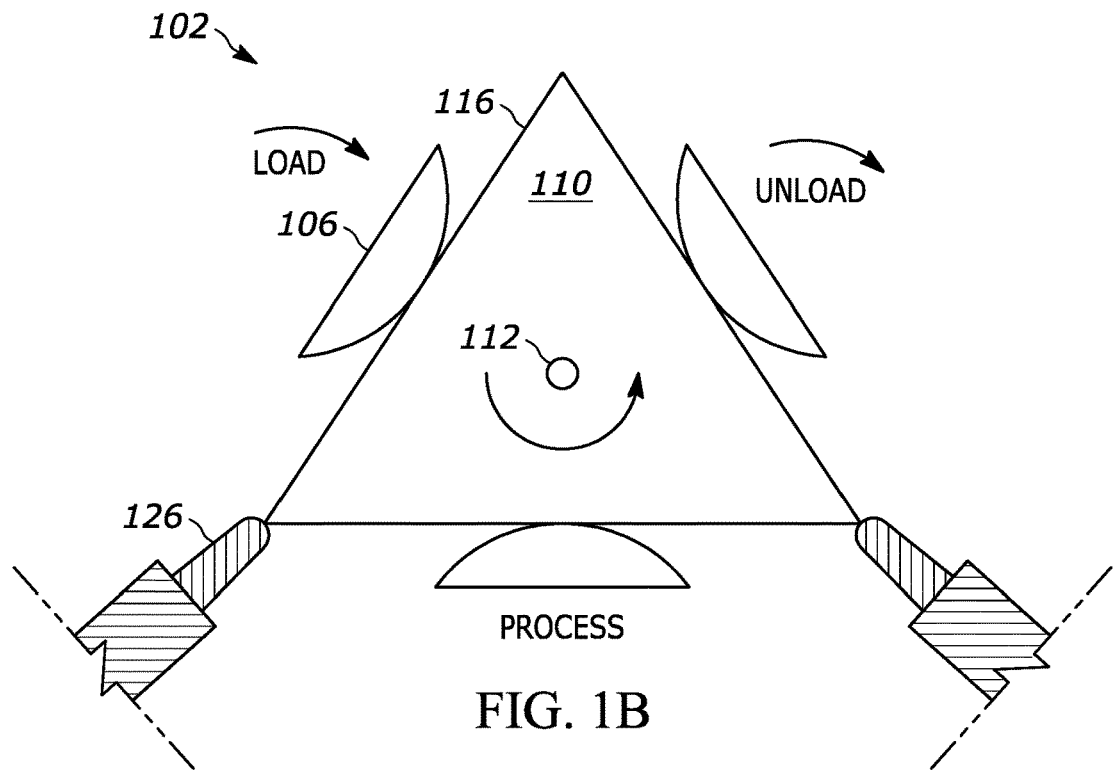
FIG. 1B is a side view of one embodiment of a conveyance assembly in accordance with the invention.
Figure 1C:
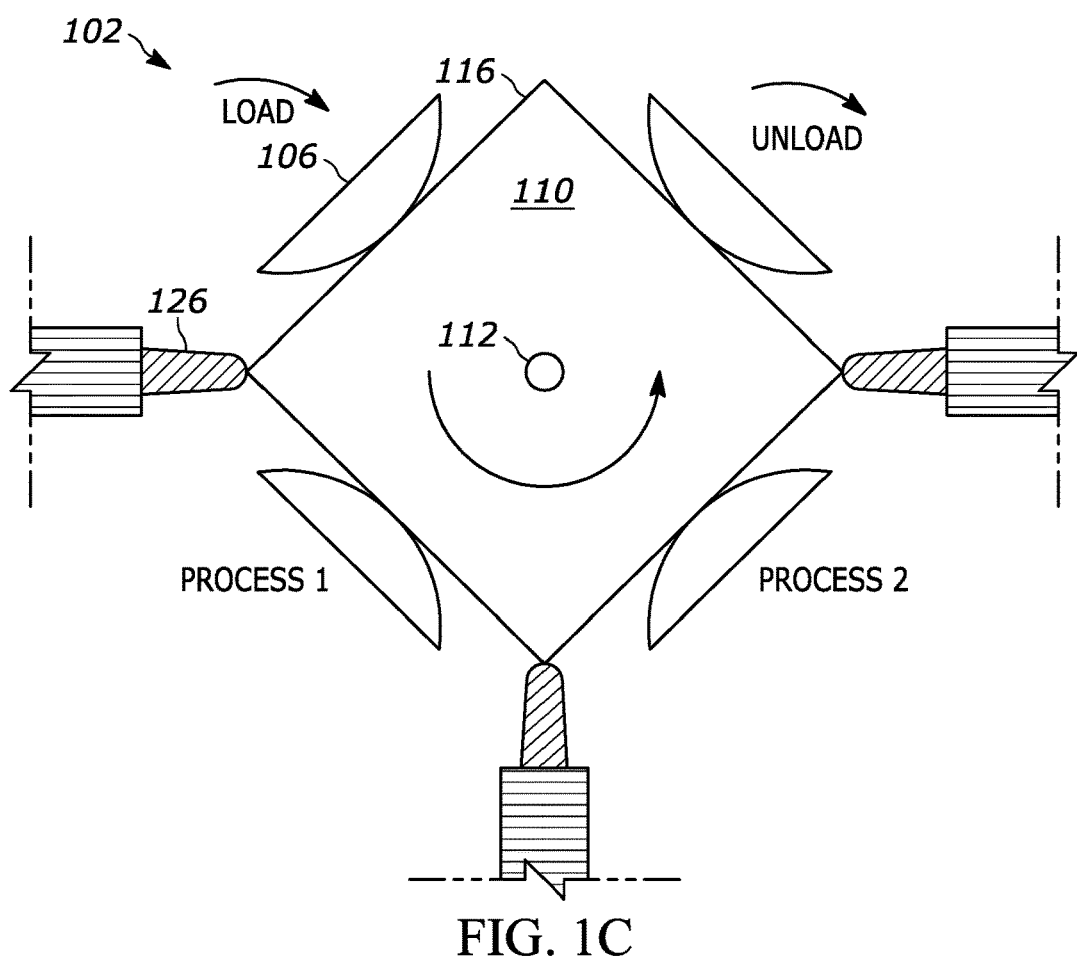
FIG. 1C is a side view of an alternative embodiment of a conveyance assembly in accordance with the invention.
Figure 1D:
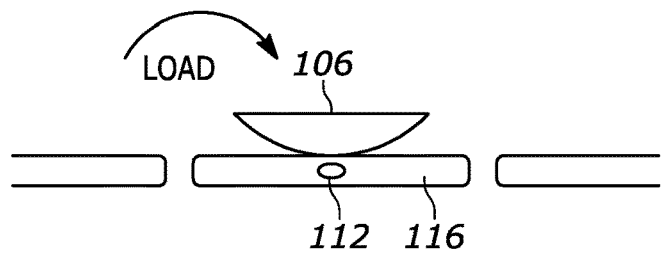
FIG. 1D is a side view of a third embodiment of a conveyance assembly in accordance with the invention.
Figure 1D:
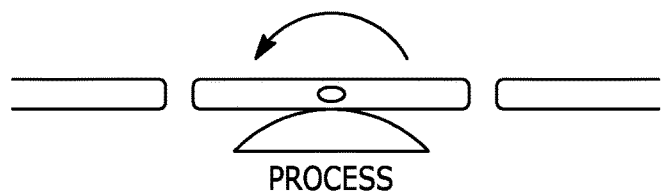
Figure 1D:
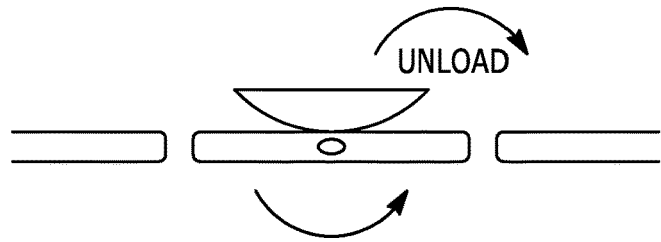
Figure 1E:
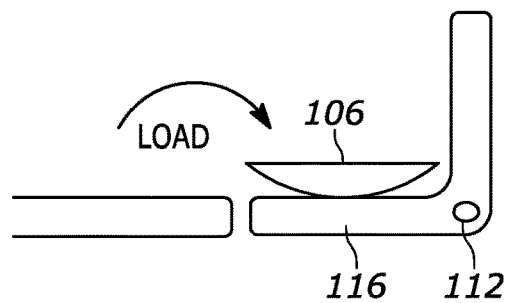
FIG. 1E is a side view of a fourth embodiment of a conveyance assembly in accordance with the invention.
Figure 1E:
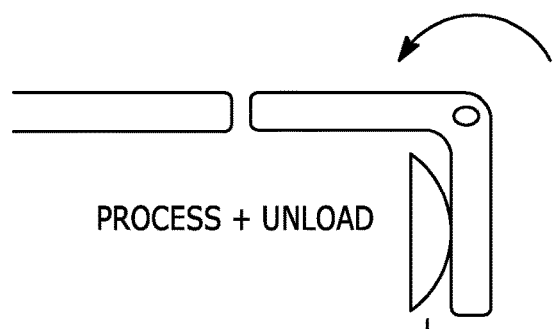

As shown in FIG. 1A, one embodiment of a system 100 for conveying dishware through a cleaning cycle may include a conveyance assembly 102 and a robotic manipulator 104. The robotic manipulator 104 may include an arm with one or more degrees of freedom to move dishware 106 from one location 120 to another.

The robotic manipulator 104 may include any configuration known to those in the art including, for example: serial, parallel, Delta, gantry, linear conveyor, rotary conveyor, or the like. Likewise, the robotic manipulator 104 may include one or multiple degrees of freedom, having any combination of active and passive joints. In one embodiment, the robotic manipulator 104 may include a first joint 114 connected to an actuator 124, and a second joint 122 having an end effector 108 to grasp dishware 106 having various shapes and sizes. The actuator 124 may include any electrical, solenoid, magnetic, hydraulic, pneumatic or other type of actuator 124 known to those in the art. The end effector 108 may utilize any method known to those in the art to grasp the dishware 106 and transfer the dishware 106 to the conveyance assembly 102.

In certain embodiments, for example, the end effector 108 may utilize magnets, mechanically interlocking geometries, traction locking, suction, vacuum, or the like, to engage and/or retain the dishware 106. The conveyance assembly 102 may retain the dishware 106 via one or more grasping elements associated with a receiving surface thereof, as discussed in more detail below.

In certain embodiments, the conveyance assembly 102 may rotate about a single axis 112 to convey the dishware 106 through multiple independent stages of a cleaning cycle. This axis 112 may be horizontal, vertical, or any angle in between, and may convey the dishware 106 through independent cleaning stages. Such cleaning stages may include, for example, an acquisition stage to load dishware 106 onto the conveyance assembly 102, a cleaning stage, a rinsing stage, a sanitizing stage, a drying stage, a sensing stage to determine whether the dishware 106 is adequately clean, and an unloading stage to unload the dishware 106 from the conveyance assembly 102. In certain embodiments, at least two of the cleaning stages correspond to unique physical locations.

The conveyance assembly 102 may move its receiving surfaces 116 and attached dishware 106 to each physical location associated with a cleaning stage to convey the dishware 106 through the cleaning cycle. As previously mentioned, the conveyance assembly 102 may rotate about a single axis 112 for this purpose. In some embodiments, the conveyance assembly 102 may rotate about more than one axis 112. Rotation about the axis 112 may be intermittent or continuous, and in some cases, may be reversible to facilitate reprocessing dishware 106 that is inadequately cleaned the first time through. In one embodiment, the conveyance assembly 102 may rotate about the axis 112 in a reciprocating or back-and-forth motion.

In some embodiments, the conveyance assembly 102 may be radially symmetric relative to the axis 112 of rotation. For example, as shown in FIGS. 1B-E, the conveyance assembly 102 may form a prismatic volume 110 such as a two-sided platform, a triangle, a rectangle, a hexagon, or an n-sided polygon. In other embodiments, the conveyance assembly 102 may be non-radially symmetric about the axis 112 of rotation and may include, for example, a wedge shape, a half-circle, a panel with an offset center of rotation, or the like.

Receiving surfaces 116 of the conveyance assembly 102 may be substantially planar and include dimensions sufficient to accommodate various types and sizes of dishware 106. Receiving surfaces 116 may be oriented such that their normal vectors point radially, parallel to, or orthogonal to a primary axis 112 of rotation. As discussed in more detail below, in some embodiments, the conveyance assembly 102 and/or receiving surfaces 116 may include features 126 to physically shield independent cleaning stages from cross-contamination.

Figure 2:
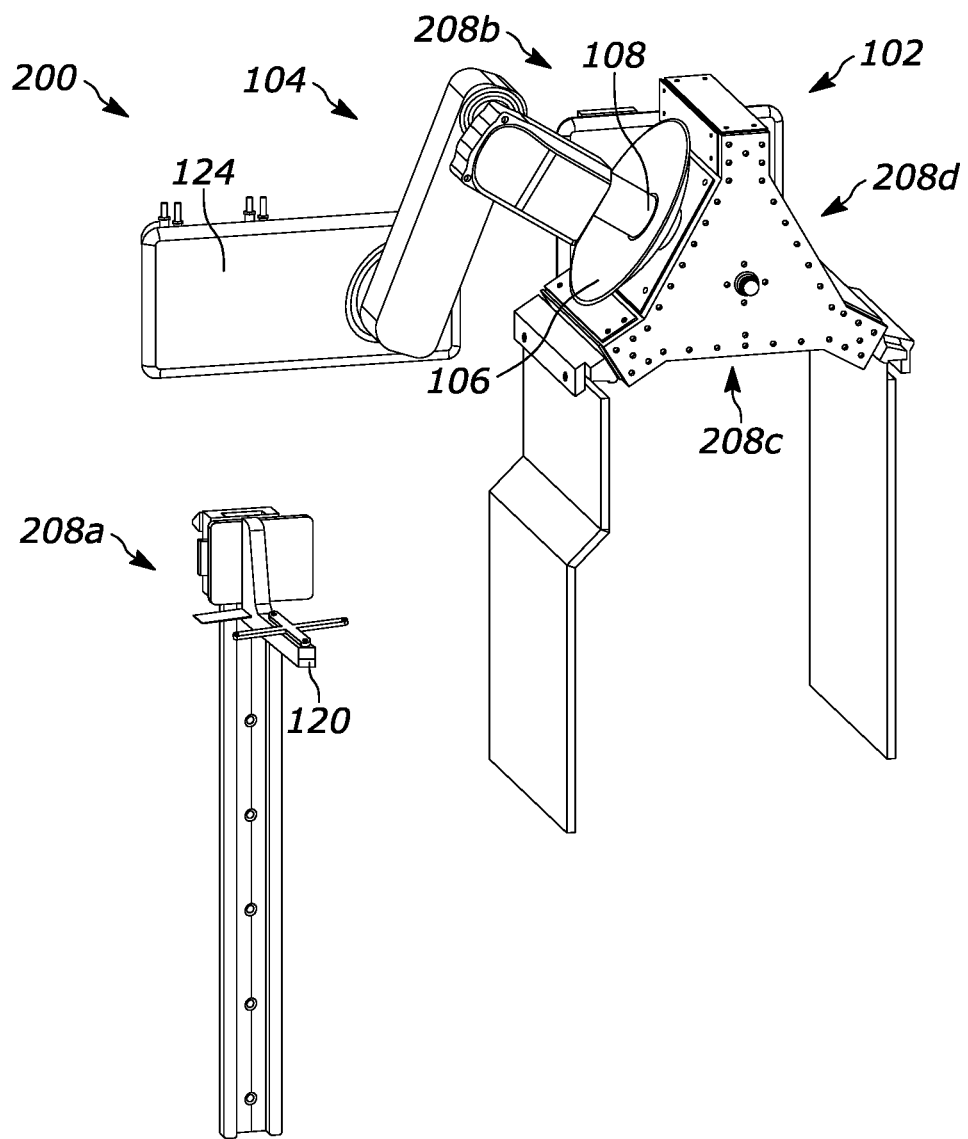
FIG. 2 is a side view of the system of FIG. 1A loading dishware onto a conveyance assembly in accordance with embodiments of the present invention.

Referring now to FIG. 2, a system 200 for conveying dishware 106 through various independent stages 208a-d of a cleaning cycle may include an actuator 124 adapted to move a robotic manipulator 104 between various positions. In certain embodiments, one or more articulated joints 114, 122 of a robotic manipulator 104 may rotate or otherwise move to position an associated end effector 108 as desired.

In one embodiment, the robotic manipulator 104 may position the end effector 108 to passively or actively engage dishware 106. In some embodiments, the end effector 108 may be positioned to engage dirty dishware 106 stacked or otherwise placed in a location 120 proximate to other system 200 components. For example, dishware 106 may be located on a conveyor belt or stacked on a cart, elevator, or table adjacent to the system 200.

In certain embodiments, the end effector 108 may passively engage the dishware 106 using, for example, one or more springs, levers, cam followers, magnets, suction cups, or the like. In other embodiments, engagement between the end effector 108 and the dishware 106 may be actively driven using electric motors, hydraulics, pneumatics, electromagnetic actuators, electrostatic actuators, or any other such device or method known to those in the art.

In one embodiment, the dishware 106 may include a ferromagnetic component attached thereto or integrated therein. For example, the dishware 106 may include one or more elements such as neodymium, iron, boron, samarium, cobalt aluminum, nickel, ceramic ferrite, stainless steel, or any other magnetic material known to those in the art. The end effector 108 may quickly and securely engage the ferromagnetic component of the dishware 106 using permanent and/or electromagnets.

Specifically, a magnetic field applied by the end effector 108 may attract the ferromagnetic component of the dishware 106. The end effector 108 may then engage the ferromagnetic component of the dishware 106. The robotic manipulator 104 may move the end effector 108 from a first location to a second location, thereby transferring the dishware 106 from its original location 120 to the conveyance assembly 102, for example.

In other embodiments, as previously mentioned, the end effector 108 may implement a mechanical retaining mechanism to engage and retain the dishware 106. The mechanical retaining mechanism may be substantially fixed and may utilize passive, unpowered components to cause the mechanism to engage the dishware 106. A mechanical retaining mechanism may include, for example, a basket, a cage, hooks, a permanent magnet, a suction cup, or other such mechanism or device. The mechanical retaining mechanism may be activated by changing its orientation or otherwise altering the gravitational force on the mechanism to cause the mechanism to engage the dishware 106. Alternatively, the mechanism may be activated by application of mechanical force, such as placing the mechanism against the dishware 106, for example.

Of course, various types of end effectors 108 may be implemented to mechanically engage dishware 106, and may include, for example, elements that are spring-loaded, gear-driven, magnetic, electrostatic, pneumatic, hydraulic, mechanically-interlocking, adherent, and/or any other such elements known to those in the art.

The conveyance assembly 102 may receive dishware 106 from an end effector 108 via one or more grasping elements. As discussed in more detail below, grasping elements may be attached to or otherwise associated with a receiving surface 116 of the conveyance assembly 102, and may include magnetic attachment mechanisms, mechanical retaining mechanisms, powered or unpowered vacuum or suction mechanisms, or any other such retaining mechanisms known to those in the art. In some embodiments, powered and unpowered grasping elements may be implemented simultaneously in any number on a single receiving surface 116.

In one embodiment, one or more sensors may be coupled to or otherwise associated with the location 120 to detect the dishware 106. Sensors may include, for example, lidar sensors, radar sensors, camera sensors, weight sensors, or the like. In certain embodiments, data gathered from the sensors may be used to identify the dishware 106 by its type or size, for example.

Upon sensing the dishware 106, the sensor may send a signal to a processor or server to substantially align the end effector 108 of the robotic manipulator 104 with the dishware 106. In another embodiment, the end effector 108 may be aligned with the dishware 106 manually, automatically, or by any other means known to those in the art. The end effector 108 may then grasp the dishware 106 and move it to substantially correspond to a location of a grasping element of the conveyance assembly 102.

Figure 3A:
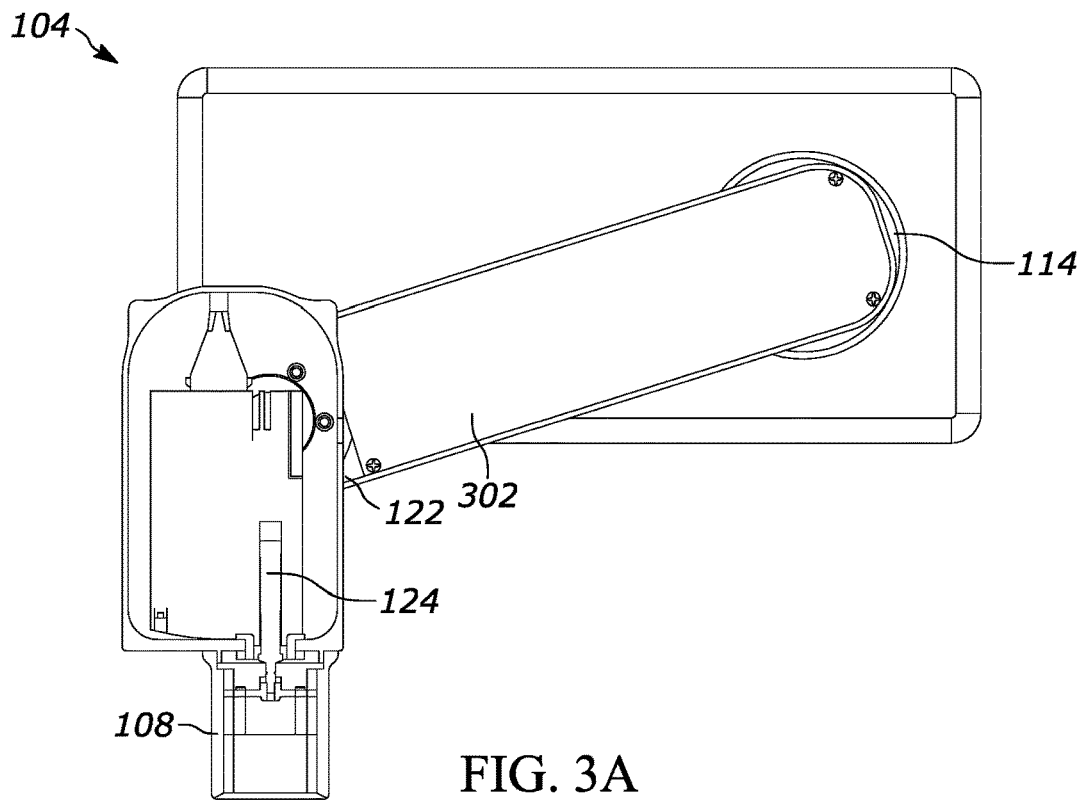
FIG. 3A is a cutaway view of one embodiment of a robotic manipulator in accordance with the present invention.
Figure 3B:
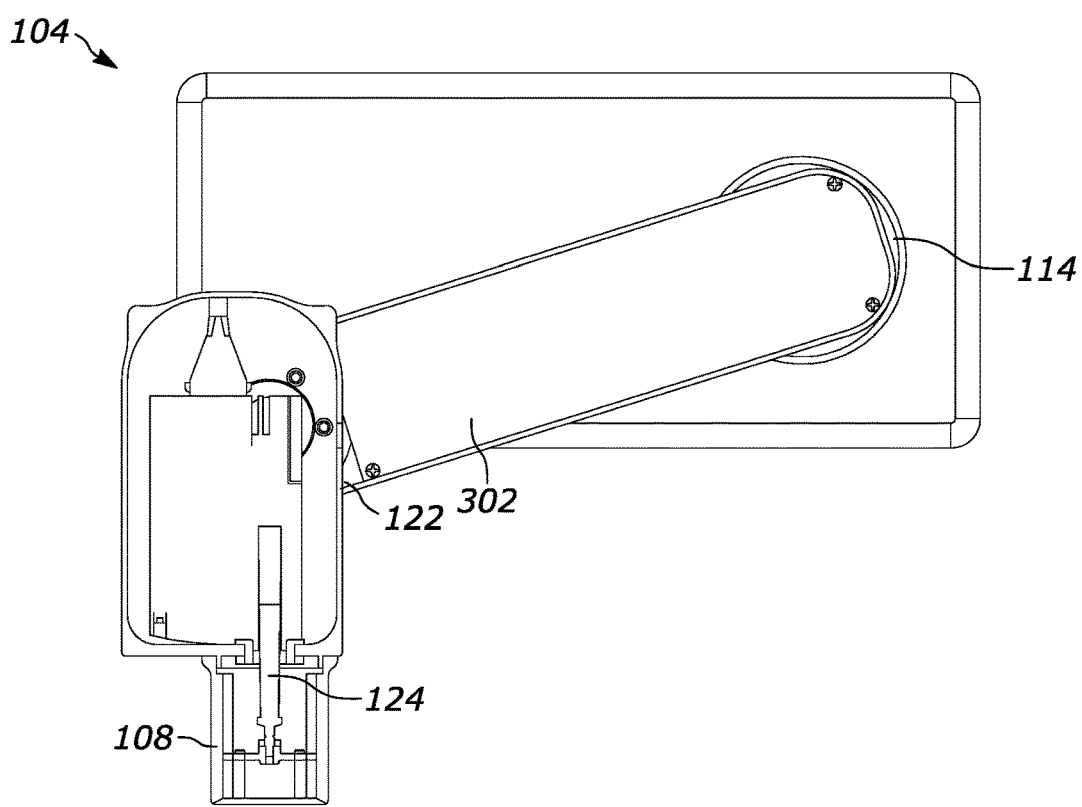
FIG. 3B is a cutaway view of the robotic manipulator of FIG. 3A with its end effector actuated in accordance with certain embodiments of the invention.

Referring now to FIGS. 3A and 3B, embodiments of the invention may implement end effectors 108 on one or more robotic manipulators 104 to load and unload dishware 106 from the conveyance assembly 102. In one embodiment, an actuator 124 may be connected to an arm 302 of the robotic manipulator 104. The actuator 124 may include any electrical, solenoid, magnetic, hydraulic, pneumatic or other type of actuator known to those in the art. A transmission mechanism including, for example, a linear drive, a slider crank, a push/pull cable, a rack and pinion, a spring, a belt, or the like, may be implemented to transfer power from the actuator 124 to move the end effector 108.

As shown, an arm 302 may have two degrees of freedom provided by a first joint 114 and a second joint 122. Of course, embodiments in accordance with the invention may include robotic manipulators 104 having one or multiple degrees of freedom, where any number of passive or active joints 114, 122 may be implemented in any combination. For example, embodiments of a robotic manipulator 104 may implement one active joint, one active and one passive joint, two active joints, or the like.

In some embodiments, the end effector 108 may include one or more permanent or electromagnets to grasp dishware 106 having a ferromagnetic component. In certain embodiments that contain permanent magnets, the end effector 108 may include a switchable magnetic base mechanism; a permanent magnet with a bell-like housing to increase magnetic flux density; dual opposing-pole permanent magnets, or the like.

In one embodiment, a second joint 122 may passively couple the magnetic end effector 108 to the arm 302. As shown in FIG. 3B, as the arm 302 approaches a conveyance assembly 102, the end effector 108 may respond to magnetic forces between a ferromagnetic component of dishware 106 on the conveyance assembly 102 and the end effector 108. The end effector 108 may swing towards or away from the dishware 106 or conveyance assembly 102 in response to such magnetic forces.

Figure 4A:
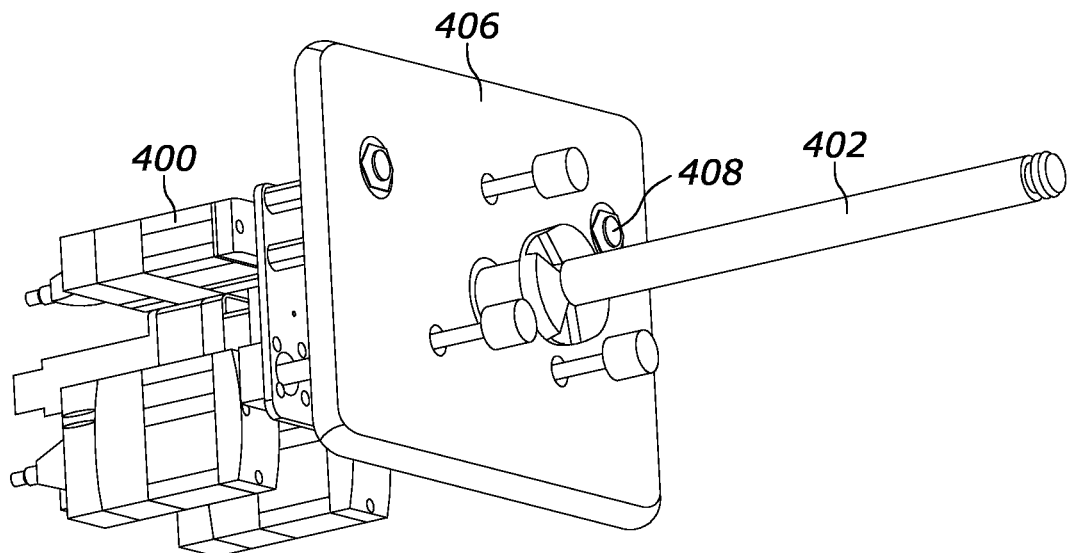
FIG. 4A is a perspective view of a motor to actuate a conveyance assembly in accordance with certain embodiments of the invention.
Figure 4B:
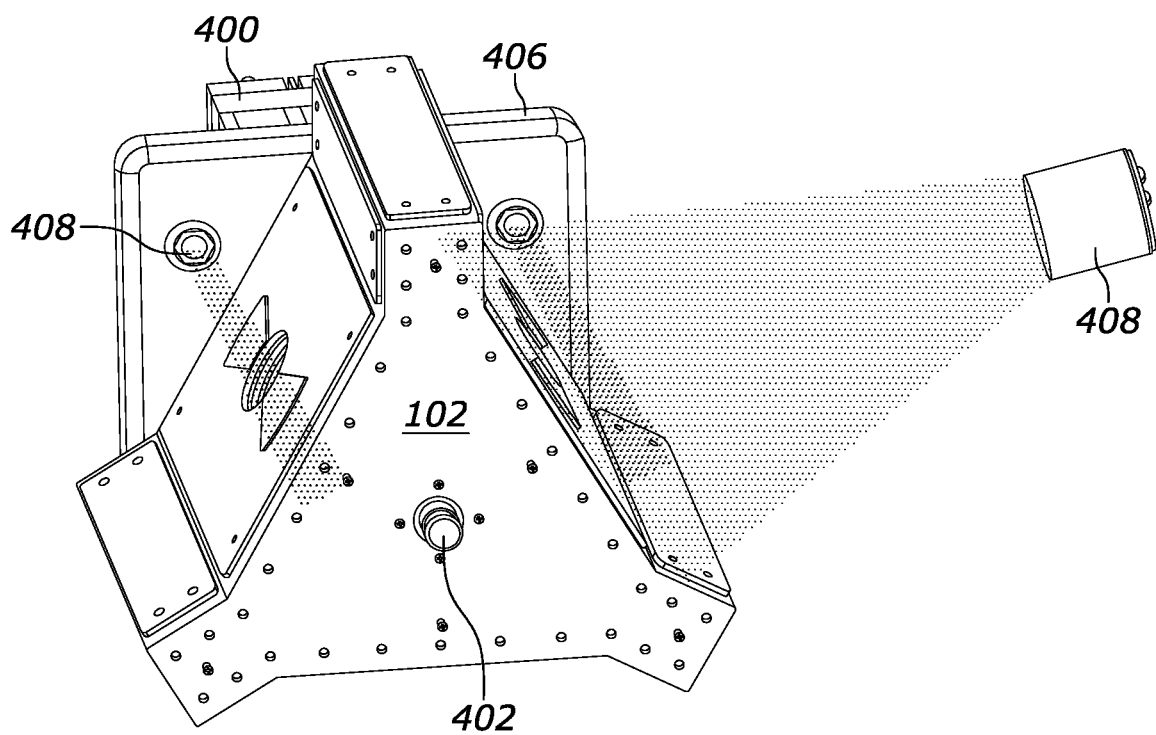
FIG. 4B is a perspective view of sensors implemented to facilitate the operation of the conveyance assembly in accordance with embodiments of the invention.
Figure 4C:
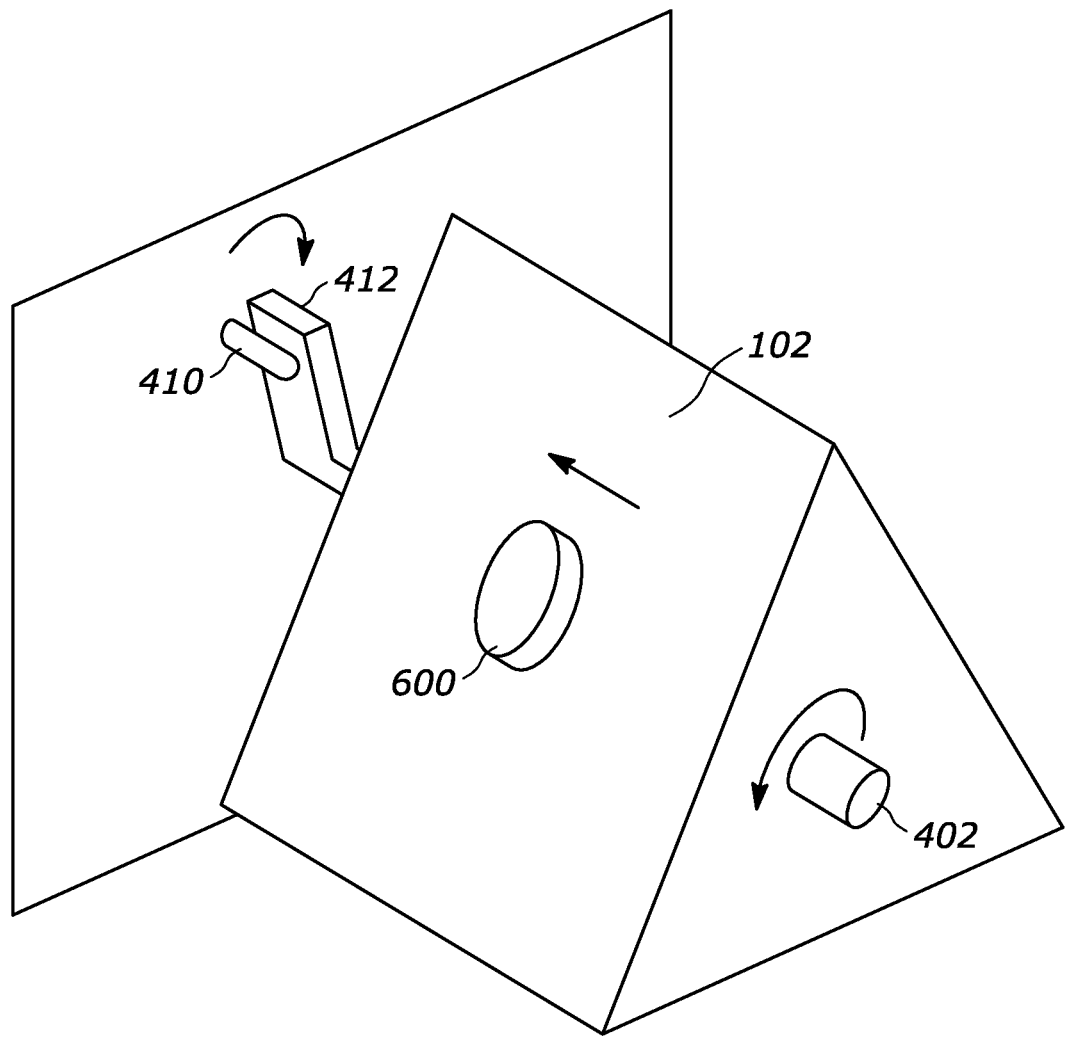
FIG. 4C is a perspective view of one embodiment of a system for powering a conveyance assembly and/or grasping element in accordance with the invention.

Referring now to FIGS. 4A-C, certain embodiments of a conveyance assembly 102 in accordance with the present invention may utilize a motor 400 or other actuator to power rotation of the conveyance assembly 102 through various independent stages 208a-d of a cleaning cycle. Such actuation may utilize electric, solenoid, electromagnetic, hydraulic, pneumatic, or other such motors or devices known to those in the art.

In some embodiments, the motor 400 may transmit power to a shaft 402 to rotate the conveyance assembly 102 about a corresponding horizontal axis 112. In such embodiments, the conveyance assembly 102 may be supported on one side via a cantilevered shaft 402, or on two sides via shafts 402 on either side of the conveyance assembly 102. Such shafts 402 may be fixed or integral to the conveyance assembly 102 or, in some embodiments, may be fixed to an offboard structure such that the conveyance assembly 102 affixes to the shaft 402 via a through-hole.

In some embodiments, rotation actuation of the conveyance assembly 102 may be accomplished offboard in a different manner. In one embodiment, the conveyance assembly 102 may be entirely supported by its outer edges, such that it rolls within a frame or structure that is actuated. In another embodiment, the conveyance assembly 102 may include a gear-toothed profile on an edge or face such that an offboard, powered drive gear meshes with the gear-toothed profile on the conveyance assembly 102 to rotate the conveyance assembly 102. In the embodiment depicted by FIG. 4C, as the conveyance assembly rotates, offboard mechanical features 410 may interact with features 412 articulating on the conveyance assembly 102. As discussed in more detail below, this type of interaction between offboard and onboard features 410, 412 may also power grasping elements 600 located on the conveyance assembly 102.

In other embodiments, rotation actuation of the conveyance assembly 102 may be onboard. For example, a rotary actuator may be located inside the conveyance assembly 102 and electrical power may be commutated or wirelessly transmitted to the conveyance assembly 102.

In some embodiments, a plate 406 may separate the axis 112 from the motor 400. As shown in FIG. 4A, in certain embodiments, the plate 406 may be equipped with various sensors to sense dishware 106 in proximity to a receiving surface 116 of the conveyance assembly 102. In other embodiments, sensors 408 may be included on a receiving surface 116 to sense the dishware 106, or elsewhere onboard or offboard of the conveyance assembly 102, as depicted by FIG. 4B.

Sensors 408 may, for example, detect the presence or absence of dishware 106 on a receiving surface 116, a location of the dishware 106, a type of dishware 106, a size of the dishware 106, or the like. In some embodiments, such sensors 408 may be used to specifically identify such dishware 106. Sensors 408 may include, for example, camera sensors, lidar sensors, radar sensors, weight sensors, or the like. This information may be used to determine appropriate cleaning parameters and/or to flag and reject certain dishware 106 from processing.

Sensors 408 onboard or internal to the conveyance assembly 102 may transmit signal data off of the conveyance assembly 102 by, for example, wired or wireless signal transfer or the like. Sensors 408 situated external to the conveyance assembly 102 may also transmit signal data via wired or wireless signal transfer.

Figure 5:
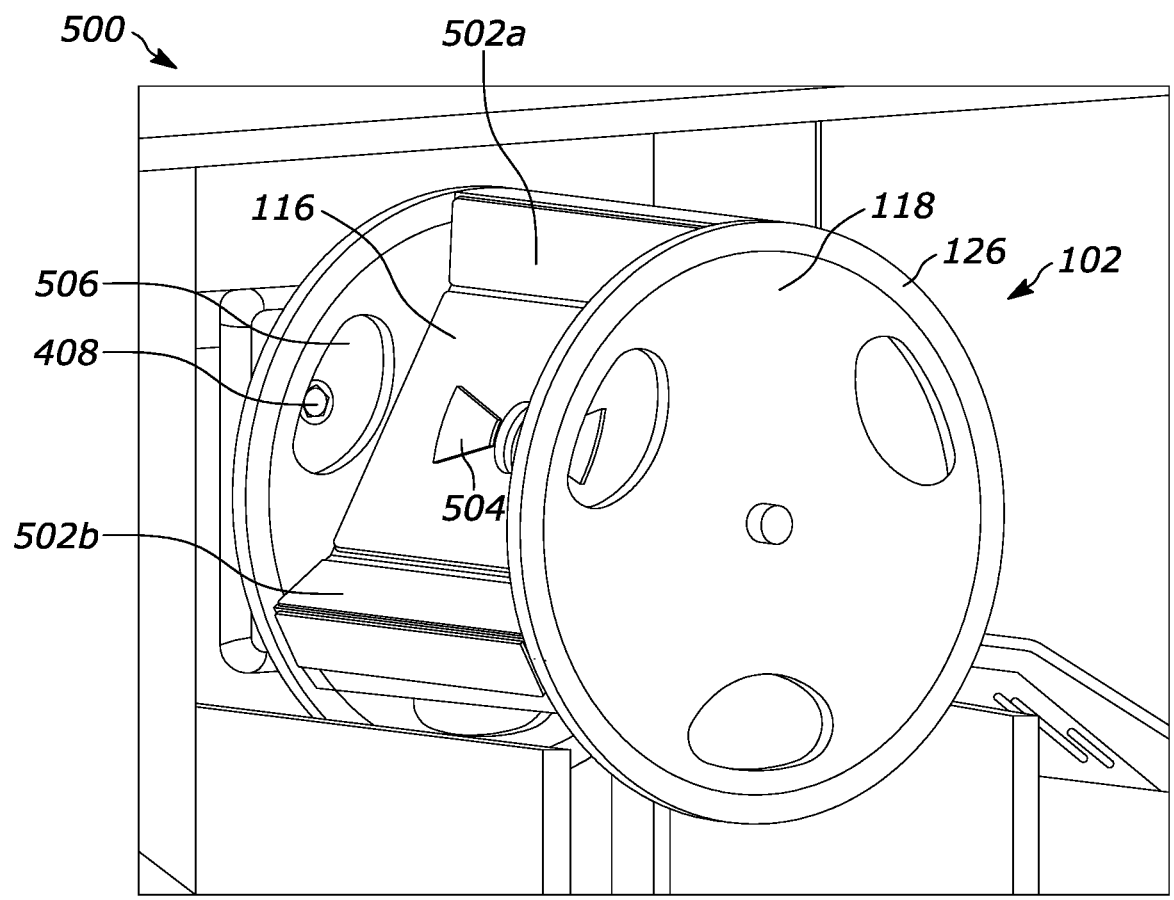
FIG. 5 is a perspective view of a conveyance assembly in accordance with certain embodiments of the invention.

Referring now to FIG. 5, in some embodiments, a system 500 in accordance with embodiments of the invention may include a conveyance assembly 102 having two or more receiving surfaces 116, each receiving surface 116 having dimensions sufficient to accommodate various types and sizes of dishware 106. One or more lobes 502a, 502b or other geometries or features may be coupled to or extending from an edge of a receiving surface 116. In some embodiments, lobes 502a, 502b may extend at an angle from the receiving surface 116 to provide a gradual slope for dishware 106 to slide off. Such lobes 502a, 502b or other features may be implemented to facilitate reliable removal of dishware 106 or direct a flow of water and/or other liquid and debris, for example.

In one embodiment, the dimensions and features of a receiving surface 116 may substantially correspond to a surrounding structure of an independent stage 208a-d. In certain embodiments, an independent cleaning stage 208a-d may direct liquid (including detergents, water, and other chemicals) towards the dishware 106. In one embodiment, a receiving surface 116 and its associated lobes 502a, 502b may coordinate with features of the surrounding structure of the cleaning stage 208a-d to isolate the liquid and/or debris within the stage 208a-d.

In other embodiments, powered or unpowered features of the conveyance assembly 102 may also isolate stages 208a-d to avoid cross-contamination between stages 208a-d. For example, powered, articulating sealing surfaces may retract while the conveyance assembly 102 is rotating, and may extend when the conveyance assembly 102 is stationary. Alternatively, as discussed above, unpowered, static features on the conveyance assembly 102 (such as lobes 204a, 204b) and/or surrounding system 500 structure may intermittently form a closed, isolated volume at an independent stage 208a-d. Such features may extend from the conveyance assembly 102, the surrounding structure, or both, to shield independent stages 208a-d from each other.

As discussed in more detail below, a receiving surface 116 may include an anti-slip element 504 to mediate contact between dishware 106 and the receiving surface 116. In one embodiment, the anti-slip element 504 may be a high friction pad or other material or coating on a substantially low friction receiving surface 116. In certain embodiments, the anti-slip element 504 may maintain a high coefficient of friction when wet. The anti-slip element 504 may comprise, for example, an elastomer such as natural latex, neoprene rubber, nitrile rubber, polyurethane rubber, silicon rubber, ethylene propylene diene monomer rubber, or the like.

In certain embodiments, an axial locking mechanism may be removably affixed to or engaged with the axis 112 to lock the conveyance assembly 102 into place during operation. In some embodiments, the conveyance assembly 102 may be easily removed from the system 500 for cleaning or repair by disengaging the axial locking mechanism such that the conveyance assembly 102 is not axially restrained. The conveyance assembly 102 may be fully sealed to protect internal components from damage from liquid and debris, and to facilitate cleaning. Additionally, in some embodiments, articulating elements on the conveyance assembly 102 may also be sealed. In one embodiment, the conveyance assembly 102 may be fully sealed to the system 500 chassis and not removable.

In some embodiments, the conveyance assembly 102 may include a side wall 118 coupled to one or more sides of the conveyance assembly 102. A portion of the side wall 118 may include a rubber, plastic, elastomeric, or other cushioning element 126 or pad coupled thereto to protect the conveyance assembly 102 in case it is inadvertently dropped or inadequately secured during operation. In certain embodiments, the cushioning element 126 may be coupled to an outer edge of the side wall 118.

In one embodiment, the side wall 118 includes a rubber grip circumferentially molded around its outer edge. Additionally, in some embodiments, one or more handholds 506 may be integrated into or attached to the side wall 118 to facilitate handling. In some embodiments, such handholds 506 may also function as throughways so as not to obstruct any offboard sensors 408.

Referring now to FIGS. 6A-J, in some embodiments, the conveyance assembly 102 may house one or more grasping elements 600a, 600b, 600c corresponding to a receiving surface 116 of the conveyance assembly 102. Any combination of powered or unpowered grasping elements 600a, 600b, 600c may be implemented to receive and retain dishware 106 during a cleaning cycle. Grasping elements 600a, 600b, 600c may also remove or allow for the removal of dishware 106 from receiving surfaces 116.

As shown in FIGS. 6B-E, static grasping elements 600a, 600b, 600c may include, for example, fixed baskets or cages 614, fixed hooks 606, a fixed suction cup 616, grooves 604, or other such fixed mechanisms to grasp and retain dishware 106. In some embodiments, unpowered grasping elements 600a, 600b, 600c may be activated by changing the orientation of the conveyance assembly 102 and gravity force vector to cause the grasping elements 600a, 600b, 600c to engage the dishware 106. In other embodiments, unpowered grasping elements 600a, 600b, 600c may be activated by an external mechanical force, such as when dishware 106 is placed thereon. In still other embodiments, the grasping elements 600a, 600b, 600c may be activated by rotation of the conveyance assembly 102 which may force the grasping elements 600a, 600b, 600c, or transmission elements connected to the grasping elements 600a, 600b, 600c, against other points of contact offboard the conveyance assembly 102, as previously discussed with reference to FIG. 4C. In any case, unpowered grasping elements 600a, 600b, 600c may utilize or incorporate passive, unpowered mechanical components to grasp dishware 106, such as springs, levers, cams, and the like.

As shown in FIGS. 6F-J, other embodiments of the invention may utilize powered grasping elements 600a, 600b, 600c that articulate to geometrically engage and retain dishware 106. In some embodiments, a powered grasping element 600a, 600b, 600c may include a mechanical grasping mechanism that articulates to apply force and traction to the surface of dishware 106. In alternative embodiments, a powered grasping element 600a, 600b, 600c may include a mechanism based on powered vacuum suction, such as the Venturi effect. In one embodiment, powered grasping elements 600a, 600b, 600c may include an electromagnet and/or permanent magnets which may move to grasp or release dishware 106 having a ferromagnetic component.

Powered articulating grasping elements 600a, 600b, 600c may include, for example, fingers, arms 618, claws 620, pincers 622, a prismatic gripper, or the like, and may be powered by any electromagnetic, hydraulic, pneumatic, or other type of motor or actuator known to those in the art. In some embodiments, an actuation source may be internal to the conveyance assembly 102, such that electrical power may be commutated into the conveyance assembly 102, or transferred wirelessly.

Figure 6A:
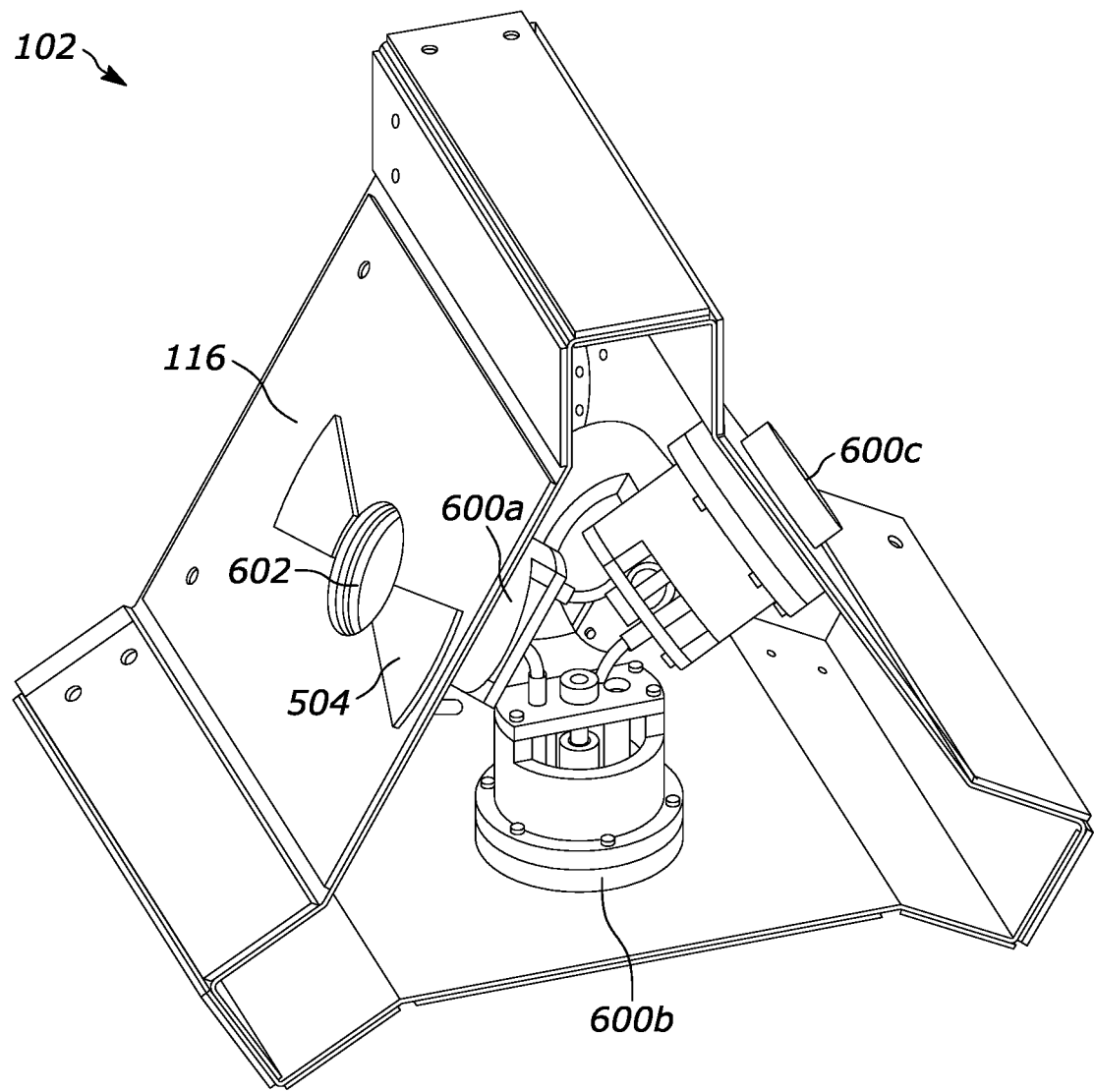
FIG. 6A is cutaway view of a conveyance assembly in accordance with embodiments of the invention.
Figure 6B:
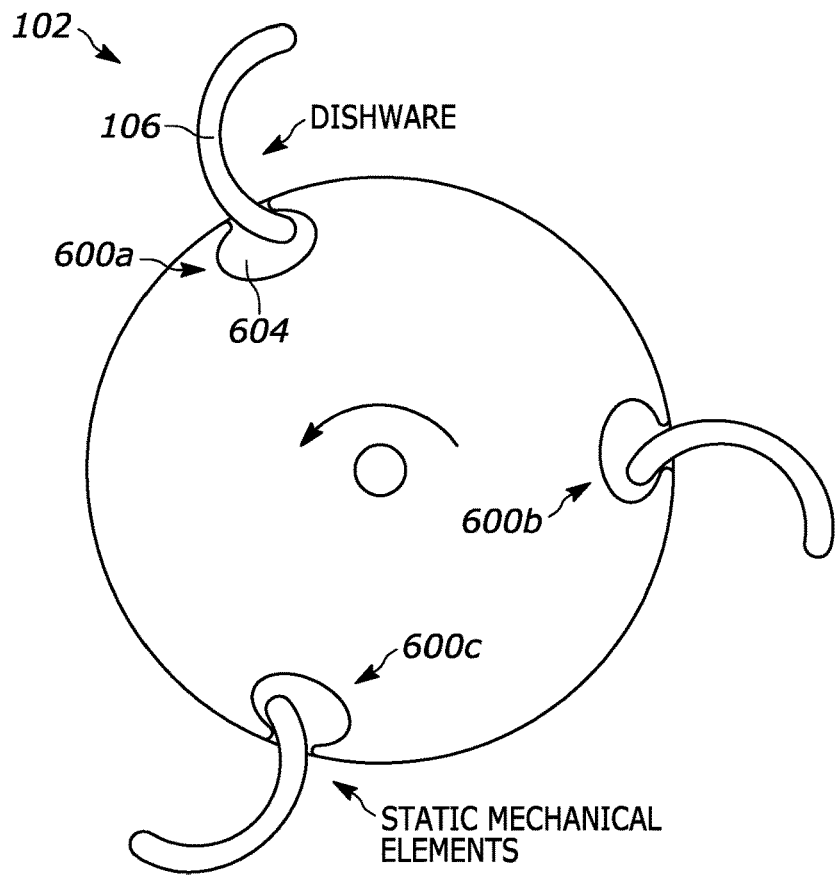
FIG. 6B is a side view of one embodiment of a conveyance assembly with grooves to retain dishware in accordance with the invention.
Figure 6C:
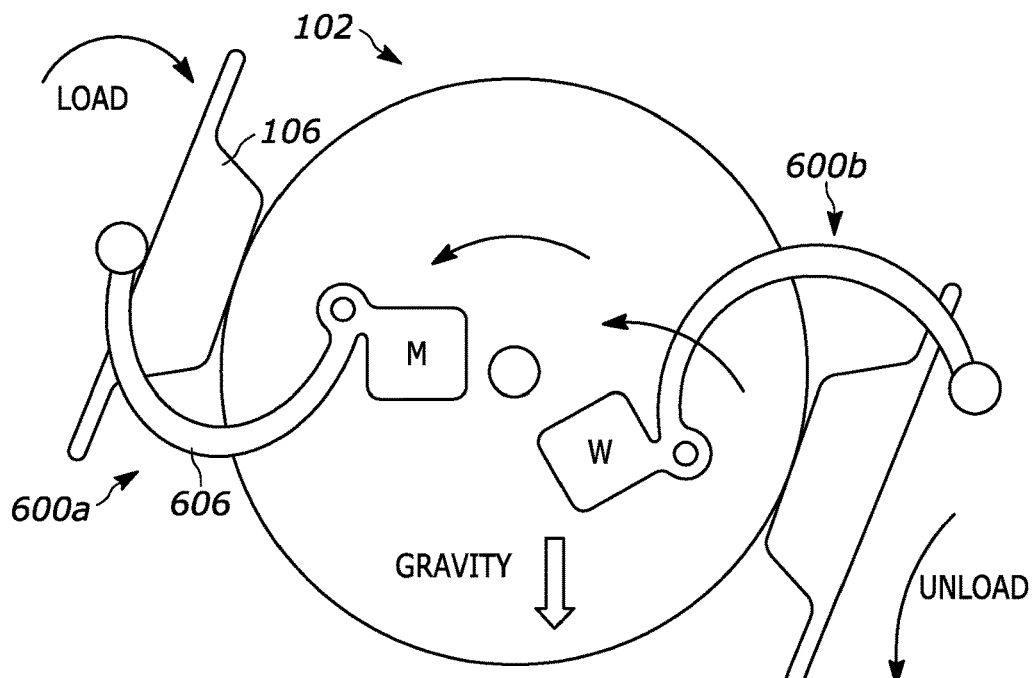
FIG. 6C is a side view of one embodiment of a conveyance assembly with articulating mechanisms that use gravity to actuate and retain dishware in accordance with the invention.
Figure 6D:
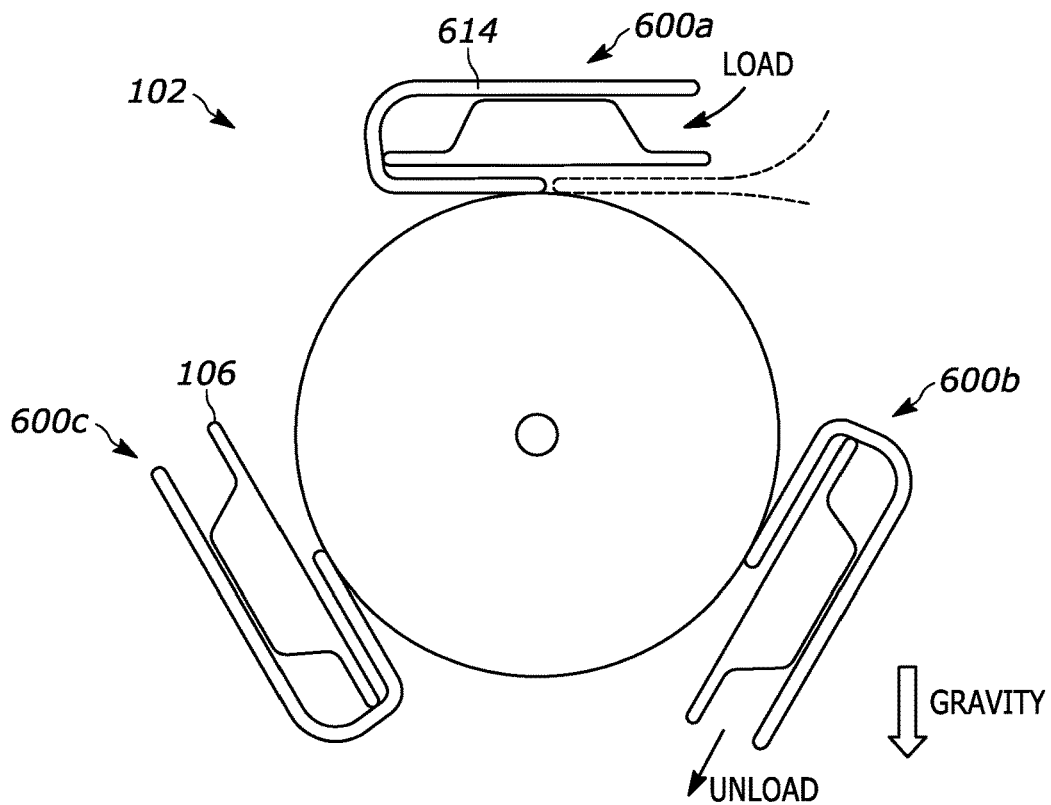
FIG. 6D is a side view of a conveyance assembly having baskets to retain dishware in accordance with certain embodiments.

Both passive and active grasping elements 600a, 600b, 600c may remove or allow for the removal of dishware 106 from receiving surfaces 116. In some embodiments, the orientation of a receiving surface 116 and gravity may work to remove dishware 106 from a grasping element 600a, 600b, 600c attached to the receiving surface 116. As shown in FIG. 6D, for example, a grasping element 600a, 600b, 600c may respond to a changing gravity direction vector by, for example, causing a basket-type grasping element 600a, 600b, 600c to open to allow the dishware 106 to fall. In other embodiments, articulating grasping elements may be driven by the changing direction of gravity acting on dishware 106 to lever the mechanism.

Figure 6E:
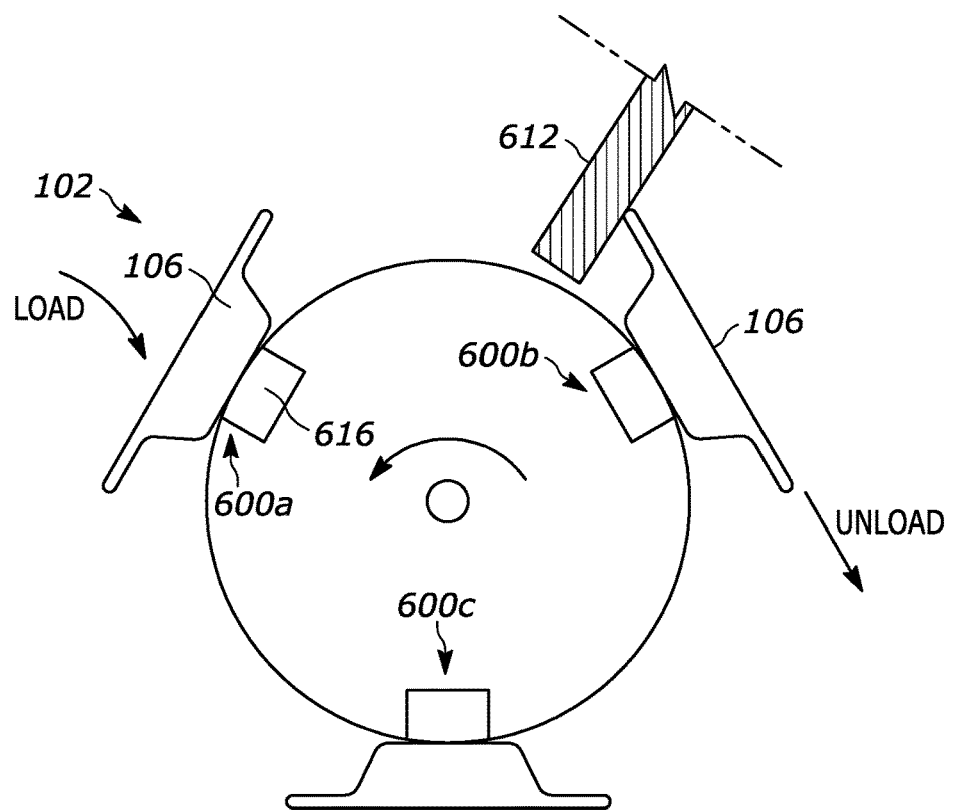
FIG. 6E is a side view of a conveyance assembly interacting with an offboard contact point to shear dishware therefrom in accordance with certain embodiments.
Figure 6F:
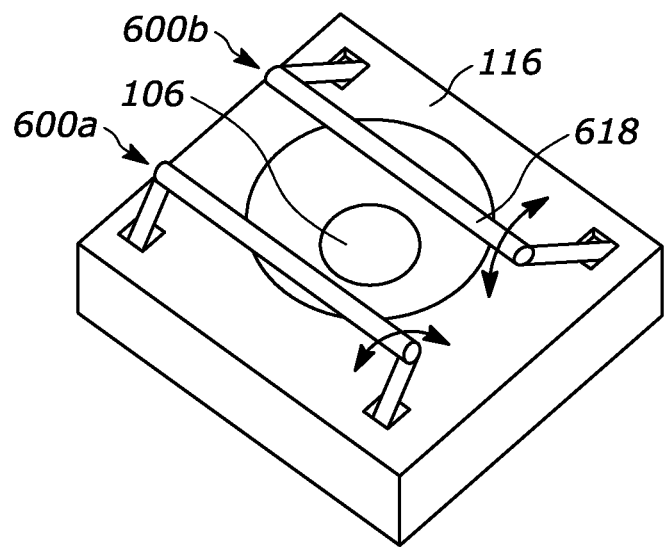
FIG. 6F is a perspective view of one embodiment of a conveyance assembly with an articulating grasping element to retain dishware in accordance with the invention.
Figure 6G:
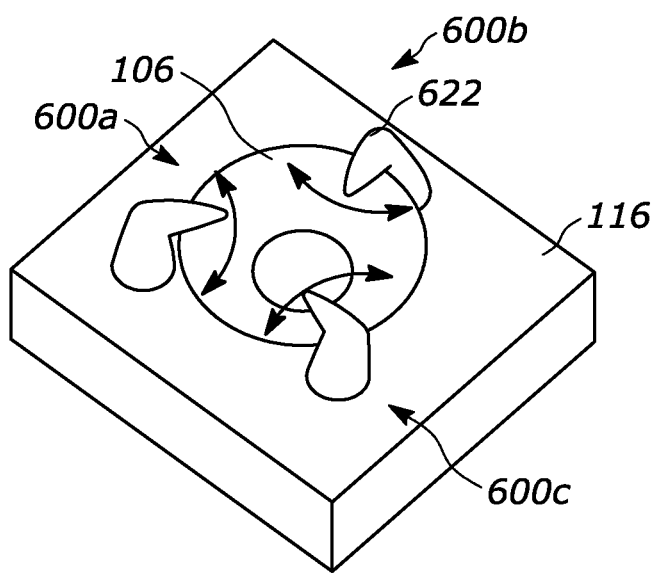
FIG. 6G is a perspective view of one embodiment of a conveyance assembly with articulating pincers to retain dishware in accordance with the invention.
Figure 6H:
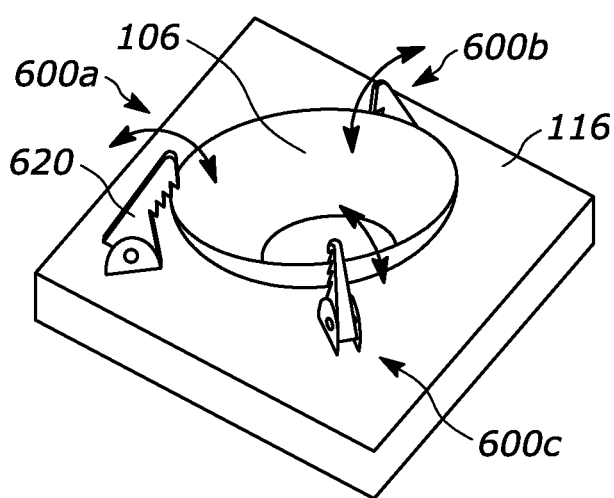
FIG. 6H is a perspective view of one embodiment of a conveyance assembly with articulating claws to retain dishware in accordance with the invention.

In some embodiments, articulating passive grasping elements 600a, 600b, 600c may interact with offboard geometries to disengage from dishware. For example, as shown in FIG. 6E, dishware 106 may be removed by conveyance assembly 102 motion and a fixed hardstop 612. In this case, the dishware 106 may run into hardstop 612 geometry that shears or pushes dishware 106 off of a receiving surface 116. In other embodiments, dishware 106 may be removed by an articulating mechanism interacting with a grasping elements 600a, 600b, 600c onboard the conveyance assembly 102. In still other embodiments, powered grasping elements 600a, 600b, 600c may reverse their grasp to actively release dishware 106.

Figure 6I:
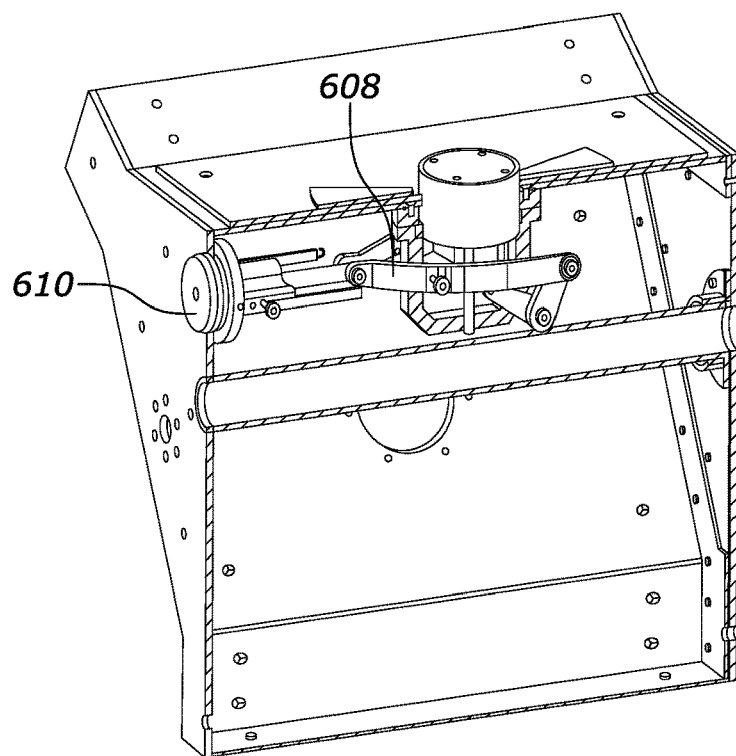
FIG. 6I is a cross-sectional view of a conveyance assembly having a bell crank linkage to actuate a grasping element in accordance with certain embodiments.
Figure 6J:
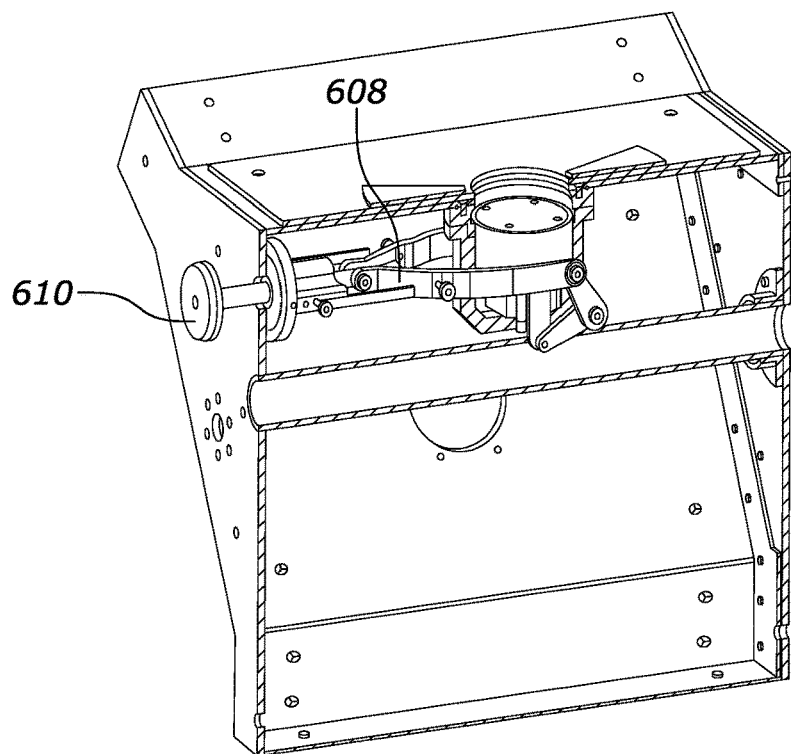
FIG. 6J is a cross-sectional view of the bell crank linkage of FIG. 6I actuated to a different position in accordance with certain embodiments of the invention.

In some embodiments, as shown in FIGS. 6I and 6J, for example, the actuator or actuation source may be external to the conveyance assembly 102. In some embodiments, as discussed above with reference to FIG. 4C, the actuator may interact with a point or feature on the conveyance assembly 102 distal to the grasping element 600a, 600b, 600c itself. The actuator may work through a transmission mechanism internal to the conveyance assembly 102 to direct mechanical power to the grasping element 600a, 600b, 600c. Alternatively, an interaction point between the actuator and the transmission mechanism may be on the side of the conveyance assembly 102 with a rod and cap, for example, such that pushing or pulling on the cap actuates the grasping element 600a, 600b, 600c.

A transmission mechanism may include, for example, a rack and pinion, a push/pull cable, a bell crank mechanism, a dual slider crank mechanism, a lever, a cam follower, or any other such mechanism known to those in the art. In one embodiment, as shown in FIGS. 6I and 6J, the transmission mechanism may be an onboard bell crank linkage 608 driven by an offboard actuator pressing on an input piston 610. Of course, a selected mode of transmission or transmission element may depend on the desired interaction method and grasping element 600a, 600b, 600c articulation.

Referring now to FIGS. 7A-F, magnetic grasping may be much stronger in the normal direction than in the lateral direction relative to a face of a grasping element 600a, 600b, 600c. To prevent premature shearing off and to stabilize attached dishware 106, an anti-slip element 504 may be implemented beneath the dishware 106 on the receiving surface 116 of the conveyance assembly 102.

In certain embodiments, an anti-slip element 504 may be coupled to or overlaid onto at least a portion of a receiving surface 116. In addition to facilitating effective release of the dishware 106 following completion of the cleaning cycle, the anti-slip element 504 may also facilitate re-positioning dishware 106 attached to a grasping element 600a, 600b, 600c, as discussed in more detail below.

In certain embodiments, an anti-slip element 504 may be patterned in a variety of ways, including voids, islands, and various shapes spaced apart from one another on the receiving surface 116. For example, the anti-slip element 504 may have a bow-tie configuration (as shown in FIG. 7B), a c-shape configuration (as shown in FIG. 7C), a cross configuration (as shown in FIG. 7D), or the like. The anti-slip element 504 may stabilize dishware 106 relative to the receiving surface 116 when the dishware 106 is engaged by a grasping element 600.

The anti-slip element 504 may be patterned, however, such that when dishware 106 is released from the grasping element 600, the dishware 106 can be passively pulled off of the grasping element 600 with the force of gravity on the dishware 106. Spaces between the anti-slip elements 504 may allow the dishware 106 to gently rock to the lower friction receiving surface 116 to avoid the anti-slip element 504 geometry as it is sheared off. A C-shape anti-slip element 504 configuration may restrict passive shear-off behavior in one direction, for example, while a bow-tie configuration may enable the dishware 106 to shear off from two opposite directions.

In embodiments having a magnetic grasping element 600 that translates the magnet in and out of the receiving surface 116, the magnetic grasping element 600 may control contact between the dishware 106 and the anti-slip elements 504a, 504b. For example, as discussed in more detail below, the grasping element 600 may selectively lift the dishware 106 off of the anti-slip elements 504a, 504b. If the dishware 106 is not contacting any anti-slip elements 504a, 504b when it is lifted from the receiving surface 116 and it remains engaged with the magnetic grasping element 600, the dishware 106 may be repositioned laterally as needed. When the magnetic grasping element 600 retracts into the receiving surface 116, it may hold the dishware 106 against the anti-slip elements 504a, 504b to stabilize it.

In other embodiments, as shown in FIGS. 7E-H, an anti-slip element 504a, 504b may be a mechanical assembly with a transitional friction property. For example, the anti-slip element 504a, 504b may include an array of elements, where each element has a slippery surface on one side and an anti-slippery surface on a reverse or opposing side. Each of the elements in the array may flip over to expose one side or the other. Actuating the array to flip over may be passive, such as with dishware 106 movement, or active via an actuator. In one embodiment, the elements may be radially arranged such that they flip over in response to a torque on dishware 106 in contact therewith.

Figure 7A:
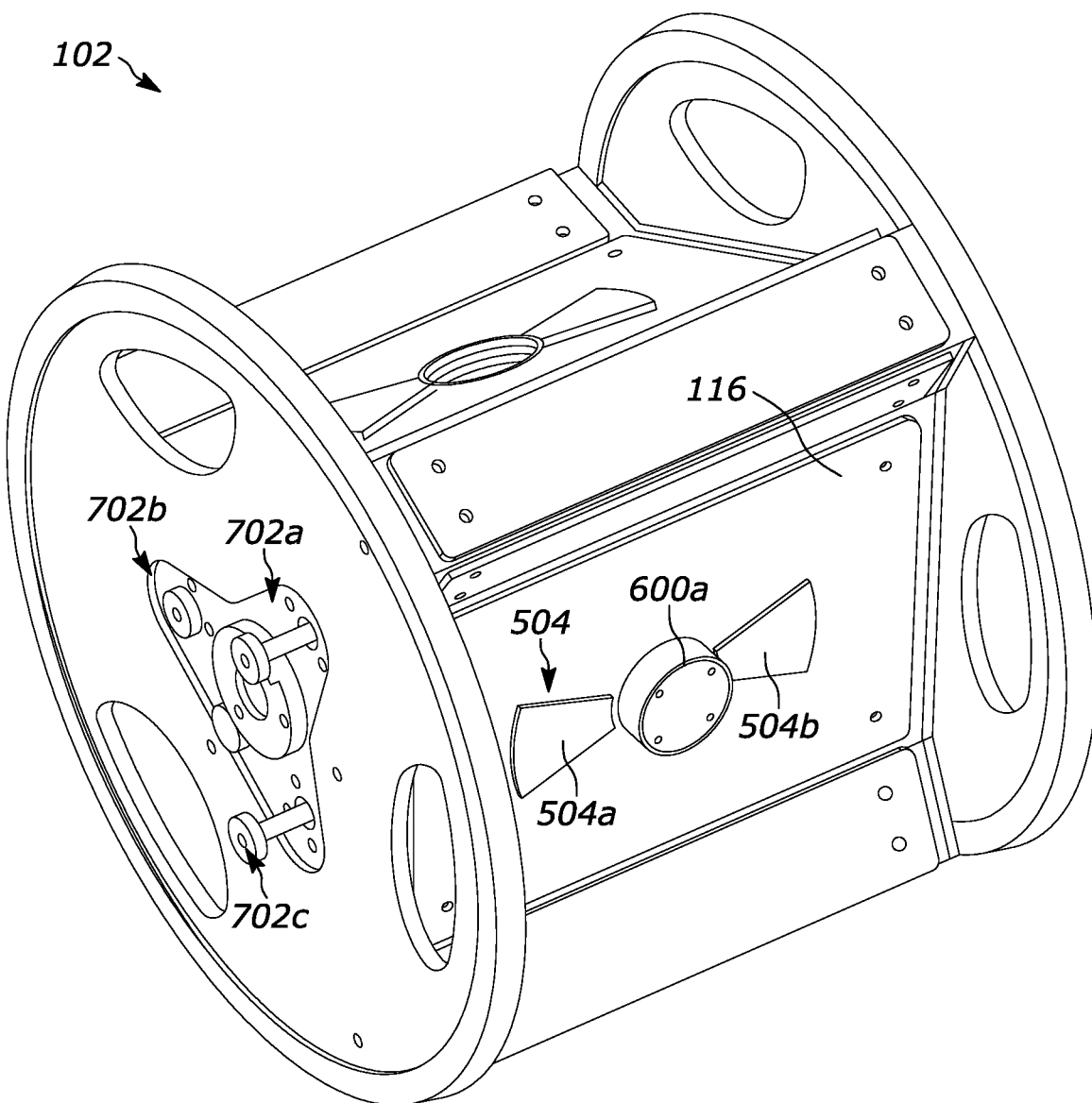
FIG. 7A is a perspective view of a receiving surface and conveyance assembly in accordance with embodiments of the invention.
Figure 7B:
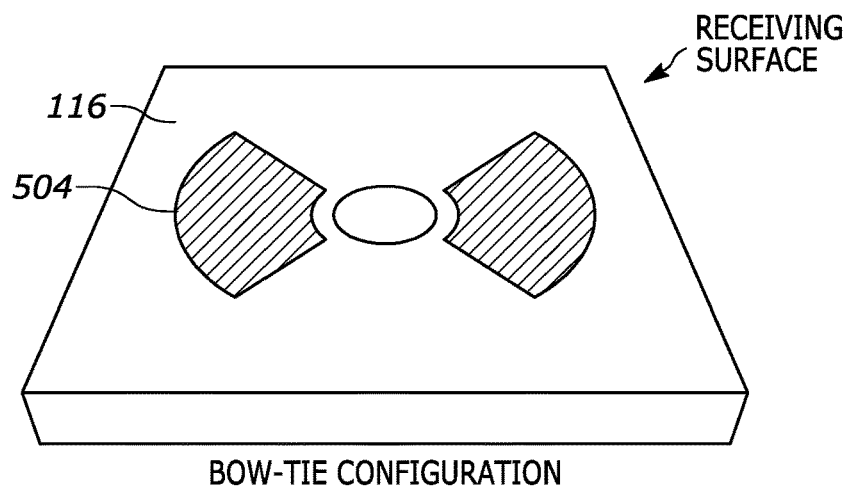
FIG. 7B is a perspective view of an anti-slip element in a bow-tie configuration in accordance with one embodiment of the invention.
Figure 7C:
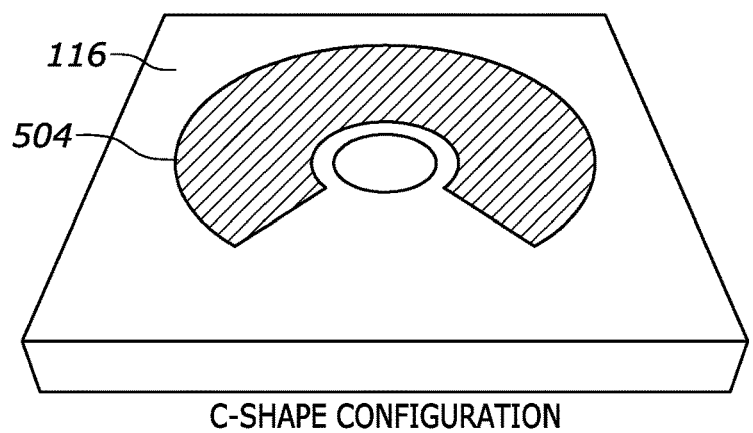
FIG. 7C is a perspective view of an anti-slip element in a C-shape configuration in accordance with another embodiment of the invention.
Figure 7D:
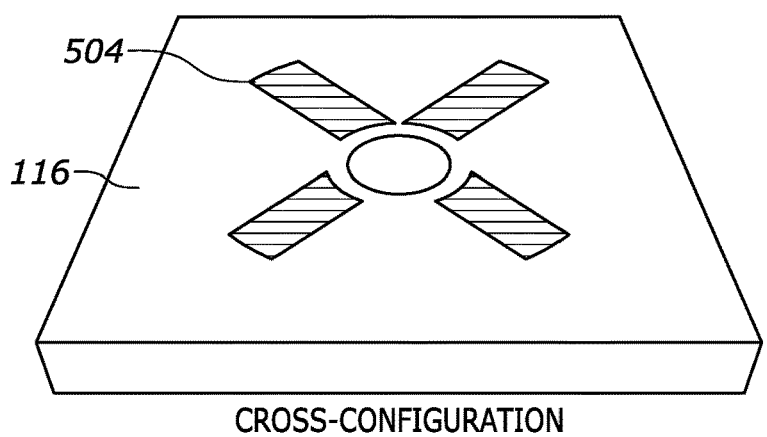
FIG. 7D is a perspective view of an anti-slip element in a cross configuration in accordance with another embodiment of the invention.
Figure 7E:
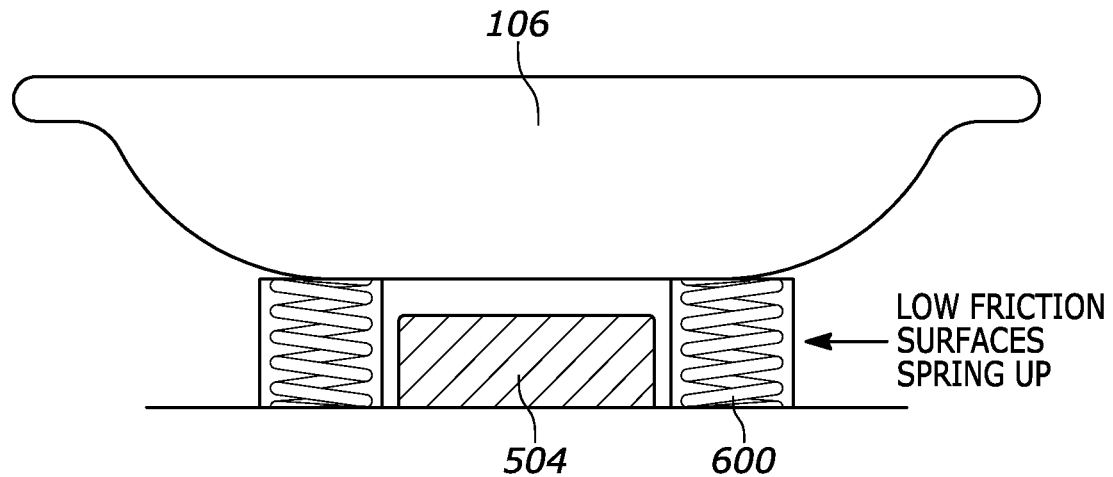
FIG. 7E is a side view of a grasping element sprung to bring dishware into contact with an anti-slip element in accordance with certain embodiments of the invention.
Figure 7F:
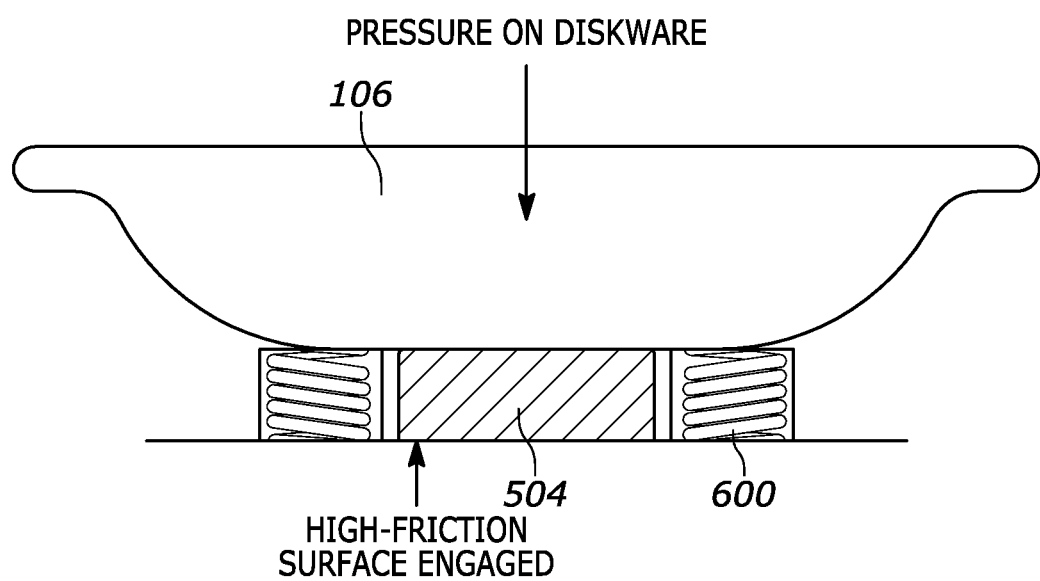
FIG. 7F is a side view of the grasping element of FIG. 7E having the dishware engaged therewith.
Figure 7G:
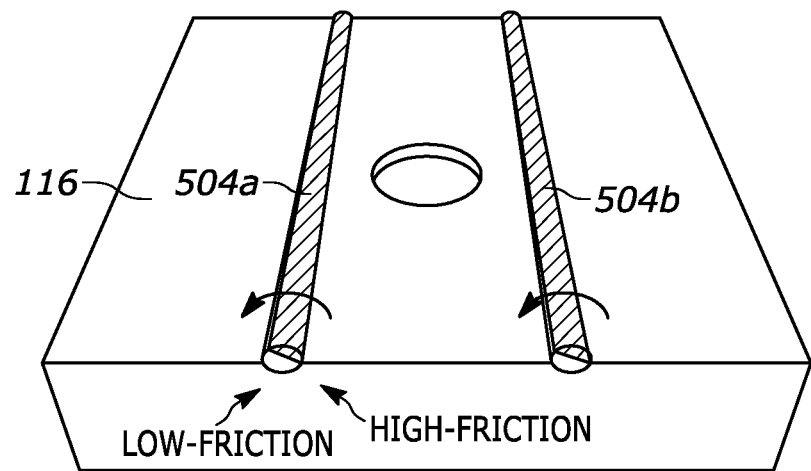
FIG. 7G is a perspective view of a transitional anti-slip element in accordance with embodiments of the invention.
Figure 7H:
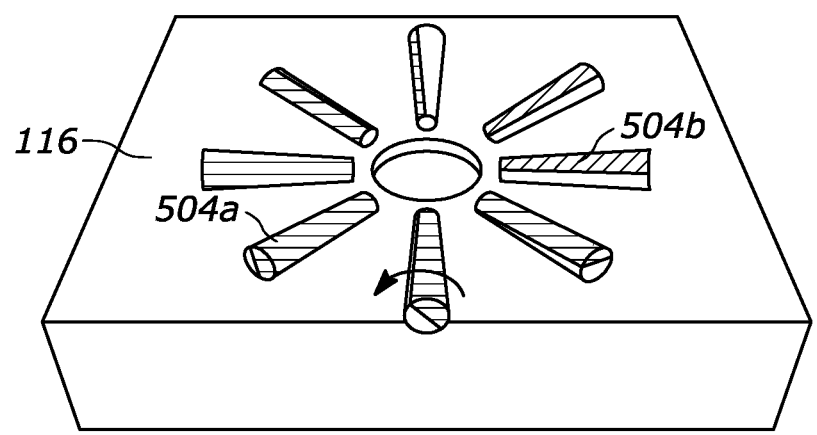
FIG. 7H is a perspective view of another embodiment of a transitional anti-slip element in accordance with embodiments of the invention.

In another embodiment, as shown in FIGS. 7E and 7F, an anti-slip element 504a, 504b may be a spring-loaded mechanism that is normally slippery, but may become anti-slip when pressure is applied on dishware 106 in contact therewith. Pressure applied to the dishware 106 in this manner may press the spring-loaded mechanism down to engage the dishware 106 with a high-friction material. In other embodiments, an anti-slip element 504a, 504b may be a geometric feature that interlocks with coordinated geometries on the dishware 106.

In certain embodiments, an actuation source external to the conveyance assembly 102 may interact with input interfaces 702a, 702b, 702c, shown as rod and cap mechanisms in FIG. 7A, to the transmission elements that engage other elements internal to the conveyance assembly 102 to actuate grasping elements 600. Each input to the transmission elements 702a, 702b, 702c may independently control an individual grasping element 600a, 600b, 600c.

Figure 8A:
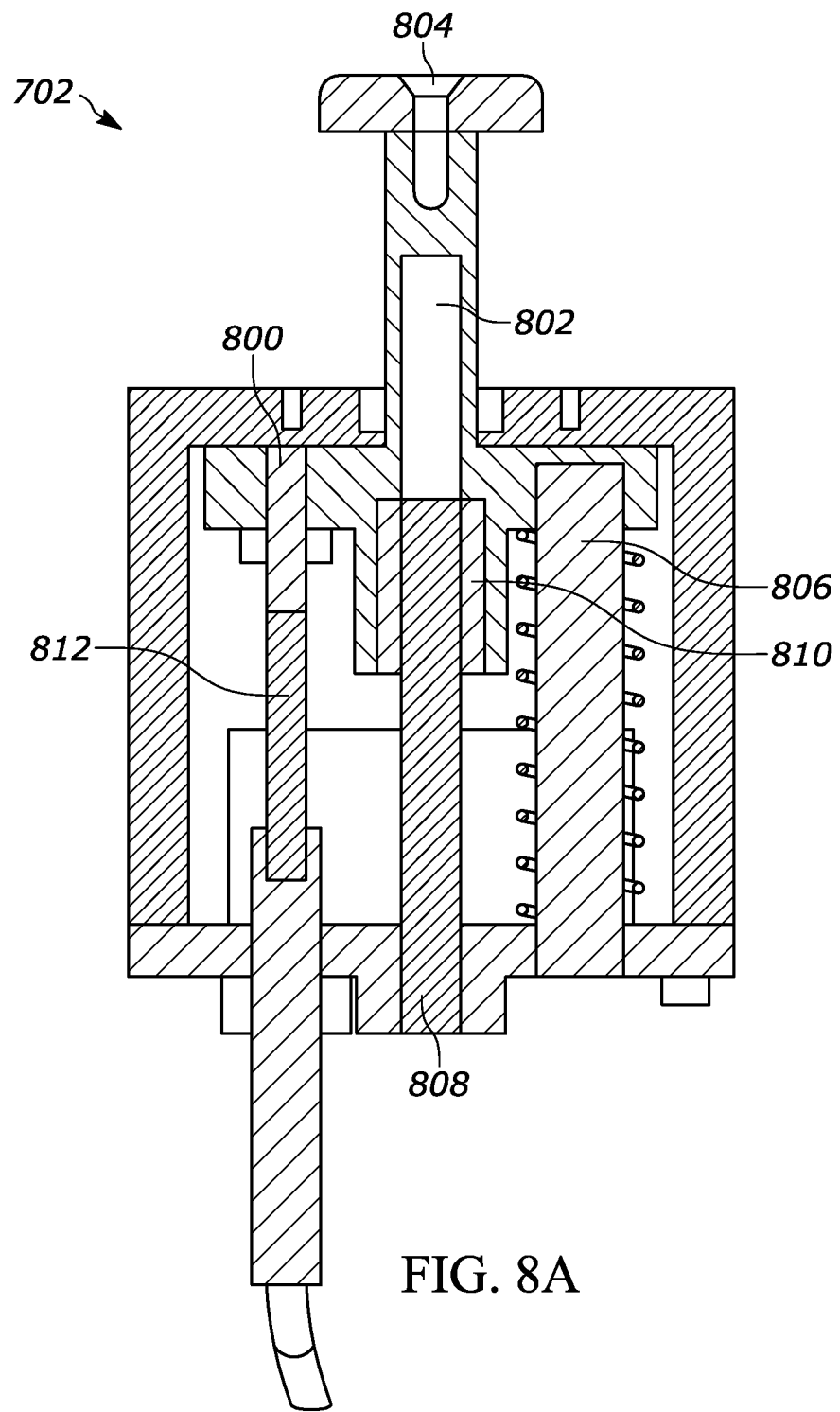
FIG. 8A is a cross-sectional view of an input mechanism element for the offboard actuator to engage the grasping element's onboard transmission mechanism in accordance with embodiments of the invention.
Figure 8B:
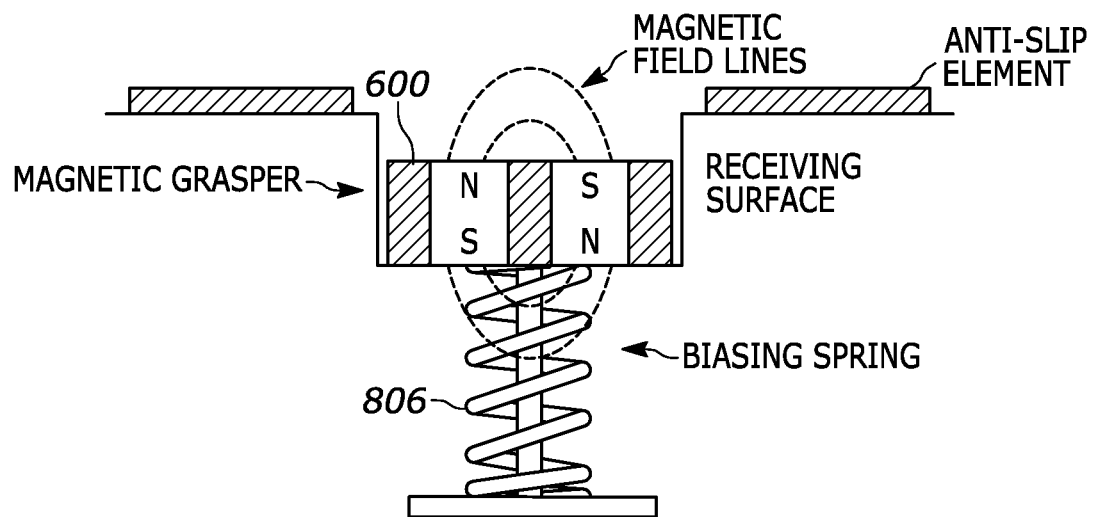
FIG. 8B is a side view of one embodiment of a grasping element utilizing a biasing element to maintain a grasp on dishware in an unpowered state.
Figure 8C:
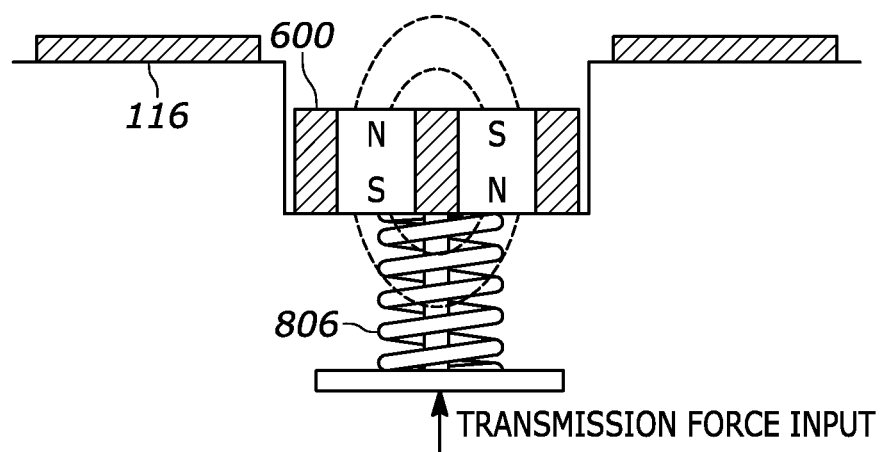
FIG. 8C is a side view of the grasping element of FIG. 8B showing application of a transmission force.
Figure 8D:
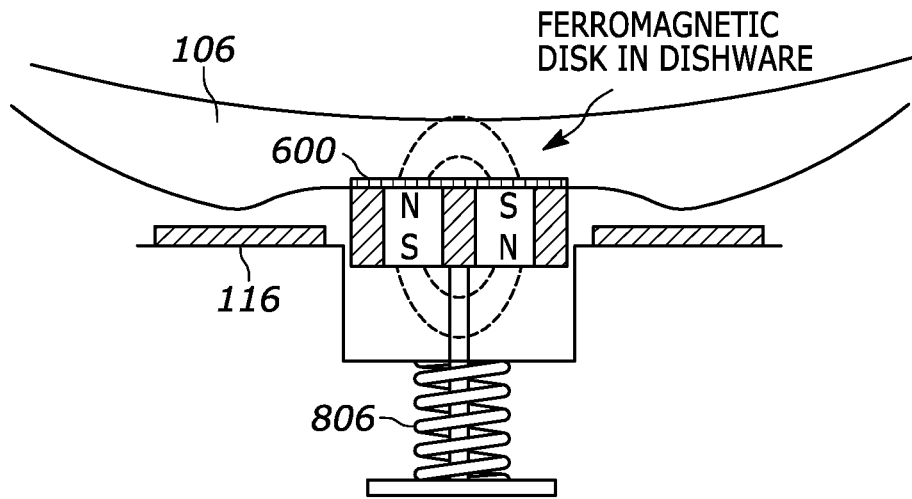
FIG. 8D is a side view of the grasping element of FIG. 8B showing its engagement with dishware.
Figure 8E:
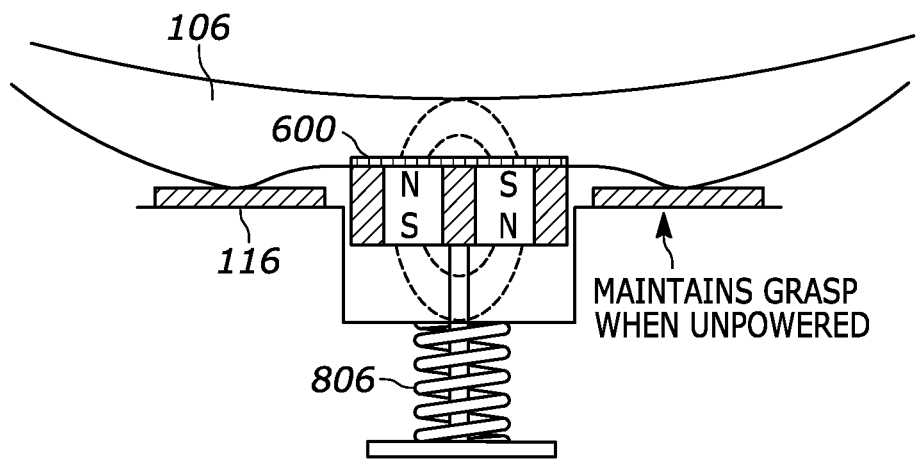
FIG. 8E is a side view of the grasping element of FIG. 8B showing its grasp on dishware in an unpowered state.

As previously discussed, in certain embodiments, the input mechanisms 702a, 702b, 702c drive transmission elements that may include, for example, bell crank linkages or push/pull cables 812 to mediate between actuation source and grasping element and selectively translate grasping elements 600a, 600b, 600c between various positions relative to the receiving surface 116. Shown in FIG. 8A is an input rod and cap mechanism 702a, 702b, 702c on the side wall of the conveyance wheel that an offboard linear actuation source may interact with to drive an onboard bell crank linkage or push/pull cable 812 transmission element, which may attach to a grasping element 600a, 600b, 600c. This system is discussed in more detail below with reference to FIGS. 11 and 12.

As shown in FIG. 8A, in some embodiments, a cap 804 may connect to the end of the spring-loaded rod 802, to be nominally pushed in to actuate the transmission element. In certain embodiments, the rod cap 804 may be ferromagnetic such that the it can be pulled out by a magnetic interface attached to the offboard actuation source actuating the transmission element. In some embodiments, a server or processor may automatically control an actuator or motor connected to the transmission element 702.

Additionally, in certain embodiments such as those depicted in FIGS. 8B-E, transmission elements 702a, 702b, 702c may include a tension mechanism 806 (such as a spring and mandrel) to automatically apply tension to associated grasping elements 600a, 600b, 600c in an unpowered state. The natural propensity of a grasping element 600a, 600b, 600c to spring back with respect to a receiving surface 116 in this manner may effectively retain dishware 106 securely against the receiving surface 116 in an unpowered state.

Figure 9A:
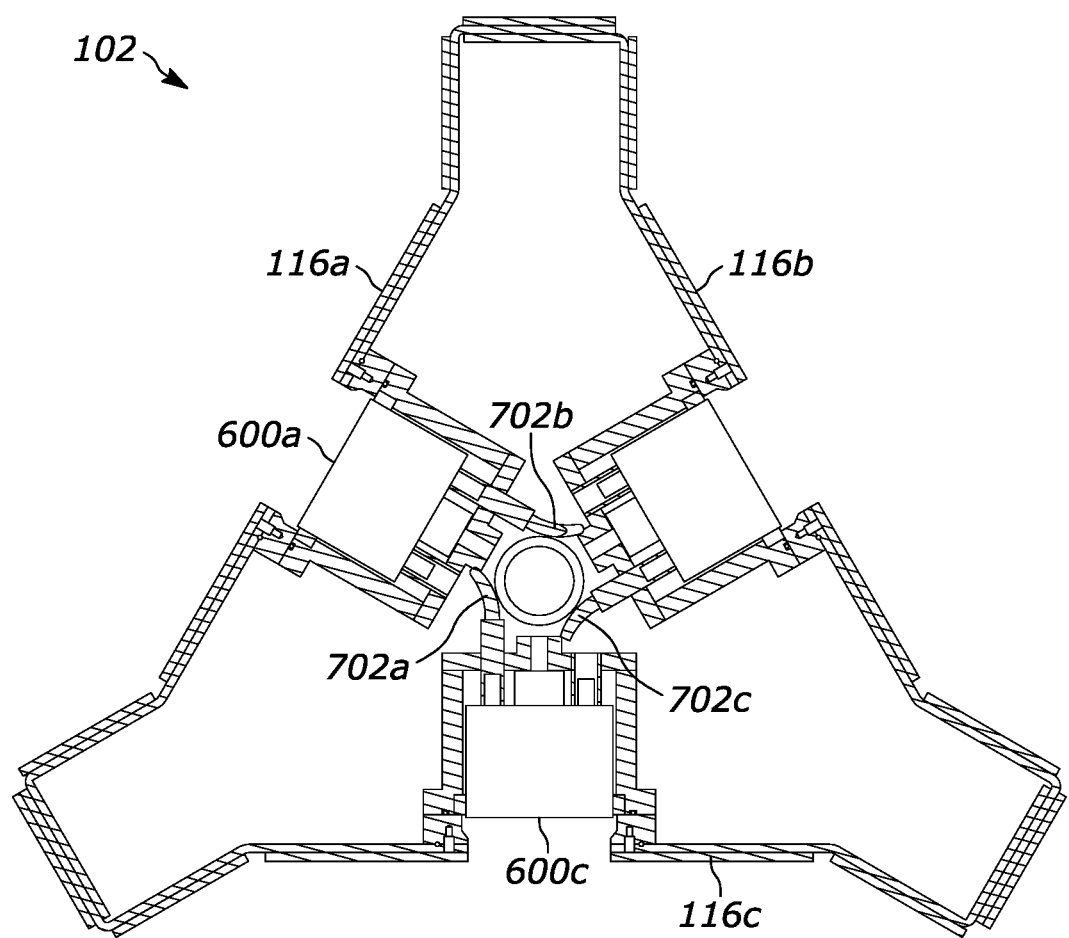
FIG. 9A is a cross-sectional view of a conveyance assembly and multiple grasping elements in accordance with certain embodiments of the invention.

Referring now to FIG. 9A, in some embodiments, individual grasping elements 600a, 600b, 600c may correspond to unique receiving surfaces 116a, 116b, 116c of a conveyance assembly 102. In other embodiments, more than one grasping element 600a, 600b, 600c may correspond to a single receiving surface 116a. As shown, in certain embodiments, each grasping element 600a, 600b, 600c may be substantially centrally located relative to its respective receiving surface 116a, 116b, 116c.

As previously discussed, in some embodiments, dishware 106 may be picked up by a robotic manipulator 104 and placed onto a grasping element 600a, 600b, 600c of a conveyance assembly 102. Magnetic grasping elements 600a, 600b, 600c may be used to grasp dishware 106 having a ferromagnetic component. In any case, embodiments of the invention provide grasping elements 600a, 600b, 600c that may be engaged and disengaged repeatably and reliably to maximize dishwashing efficiencies.

Magnetic grasping mechanisms may be implemented in connection with a robotic manipulator 104 end effector 108, grasping elements 600a, 600b, 600c coupled to a conveyance assembly 102, or both. For simplicity, magnetic grasping mechanisms will be described in connection with grasping elements 600a, 600b, 600c, but may be understood as having application to an end effector 108 as well. In either case, fixed, static electromagnets and/or permanent magnets may be used for grasping purposes.

Magnetic attraction force relative to dishware 106 ferromagnetic components may be controlled by transitioning magnetic grasping elements 600a, 600b, 600c between various states. Where electromagnets are used, they may be switched on to engage dishware 106 having a ferromagnetic component, and switched off to disengage such dishware 106.

Where permanent magnets are used, they may be fixed such that they passively engage dishware 106 placed on their surface. Disengagement may be achieved by application of an external forcing element, such as a rigid stop that pries or shears off the dishware 106 as the grasping element 600a, 600b, 600c moves past it. In alternative embodiments, a controlled mechanism may actively pry or shear dishware 106 from the magnet. For example, in one embodiment, an actuated swiper arm mechanism onboard or offboard the conveyance assembly 102 may shear the dishware 106 from the grasping element 600a, 600b, 600c. In another embodiment, a pry-off mechanism may be attached to the conveyance assembly 102 or end effector 108 to remove the dishware 106.

Figure 9B:
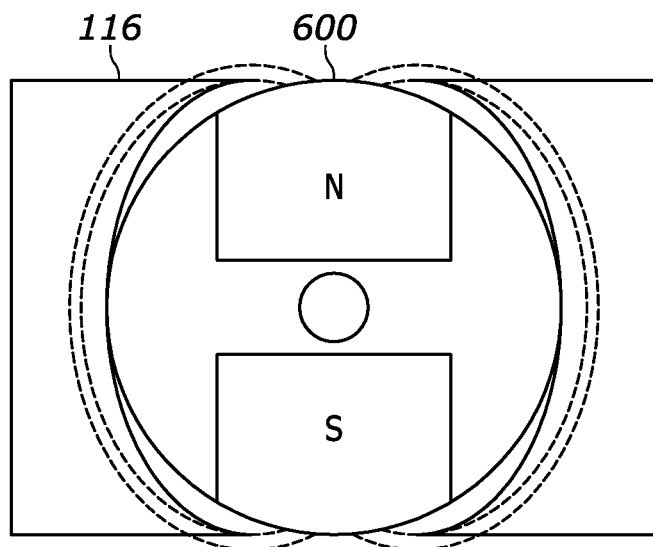
FIG. 9B is a side view of a rotating magnetic grasping element, also referred to as a magnetic base mechanism, in accordance with one embodiment of the invention.
Figure 9C:
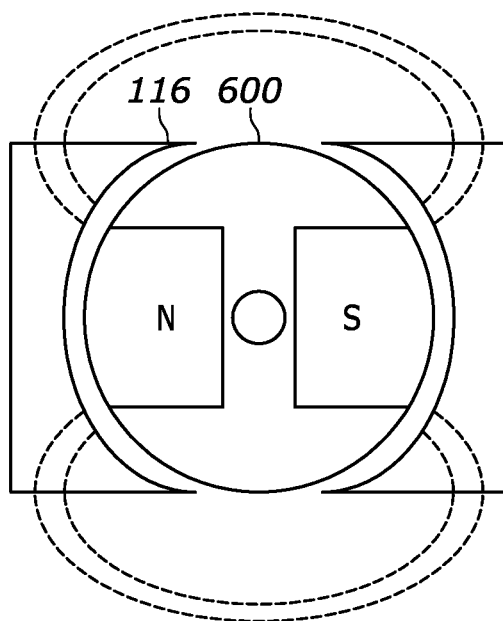
FIG. 9C is a side view of another embodiment of a rotating magnetic grasping element in accordance with the invention.
Figure 9D:
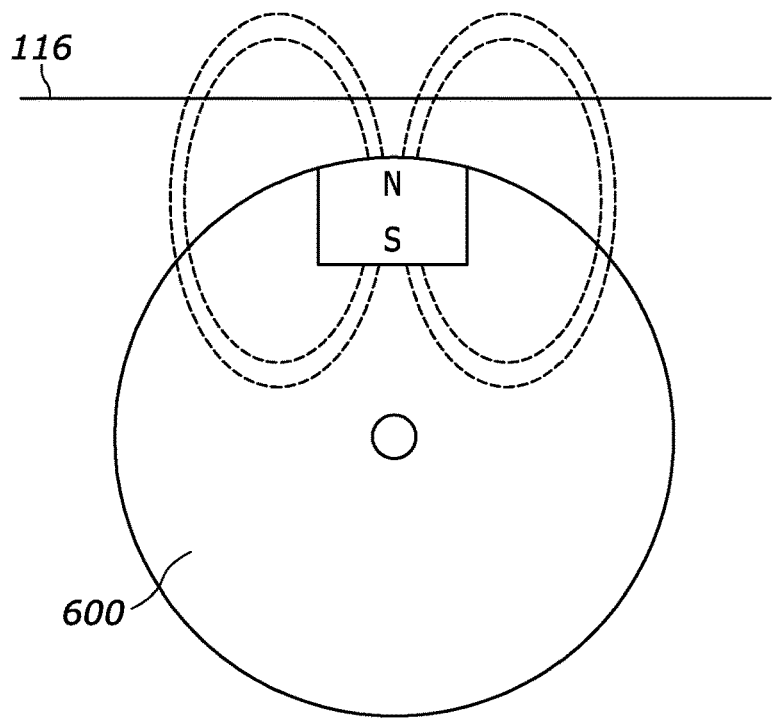
FIG. 9D is a side view of another embodiment of a rotating magnetic grasping element in accordance with the invention.
Figure 9E:
FIG. 9E is a side view of another embodiment of a rotating magnetic grasping element in accordance with the invention.

In certain embodiments, a grasping element 600a, 600b, 600c may include permanent magnets that are switchable via an actuated switchable magnet mechanism, or magnetic base, known to those in the art. In such embodiments, as shown in FIGS. 9B and 9C, magnetic flux output may be modulated by, for example, rotating a permanent magnet relative to its housing. The rotation of the magnets can also be performed as shown in FIGS. 9D and 9E, by rotating the permanent magnets towards or away from the receiving surface plane.

In some embodiments of a grasping element 600a, 600b, 600, permanent magnets and electromagnets may be used simultaneously, such that when the electromagnets are energized they may create a magnetic field that is reverse to the magnetic field direction of the permanent magnets. This may result in a net reduction in output magnetic field strength from the magnetic grasping element 600a, 600b, 600c in which they are used.

Each grasping element 600a, 600b, 600c may include a transmission element 702a, 702b, 702c to selectively transition the grasping element 600a, 600b, 600c between at least two states. In some embodiments, one state may allow the grasping element 600a, 600b, 600c to engage dishware 106 while another state may allow the grasping element 600a, 600b, 600c to disengage the dishware 106. In some embodiments, a transmission element 702a, 702b, 702c may also selectively lock a corresponding grasping element 600a, 600b, 600c into a desired position or state.

In one embodiment, a grasping element 600a, 600b, 600c may transition between an extended position and a retracted position relative to the receiving surface 116 of a conveyance assembly 102. As discussed in more detail below, in some embodiments, an extended or neutral position may allow the grasping element 600a, 600b, 600c to grasp and retain dishware 106 while a retracted position may allow the grasping element 600a, 600b, 600c to disengage the dishware 106.

In another embodiment, a grasping element 600a, 600b, 600c may rotate about an axis to transition between two or more states. The axis may be horizontal relative to the receiving surface 116, and one or more magnets may be coupled to one side of the grasping element 600a, 600b, 600c. As shown in FIGS. 9D and 9E, in this manner, the grasping element 600a, 600b, 600c may grasp and retain dishware 106 when the magnets are positioned upward or substantially adjacent to the dishware 106, and may disengage the dishware 106 when the grasping element 600a, 600b, 600c is rotated downward such that the magnets are away from the dishware 106.

Various types and combinations of grasping elements 600a, 600b, 600c and transmission elements 702a, 702b, 702c may be used in a conveyance assembly 102. For example, in one embodiment, a push/pull cable transmission element 702a may correspond to one grasping element 600a, while a bell-crank linkage type transmission element 702b may correspond to another grasping element 600b. Additionally, grasping elements 600a, 600b, 600c may be independently actuated such that one grasping element 600a may be extended relative to a corresponding receiving surface 116a while another grasping element 600b is retracted or neutral relative to its receiving surface 116b. In this manner, each grasping element 600a, 600b, 600c and transmission element 702a, 702b, 702c is fully independent and able to function as needed with respect to any particular independent stage 208a-d. Grasping elements can also be dependent and controlled simultaneously.

Figure 10:
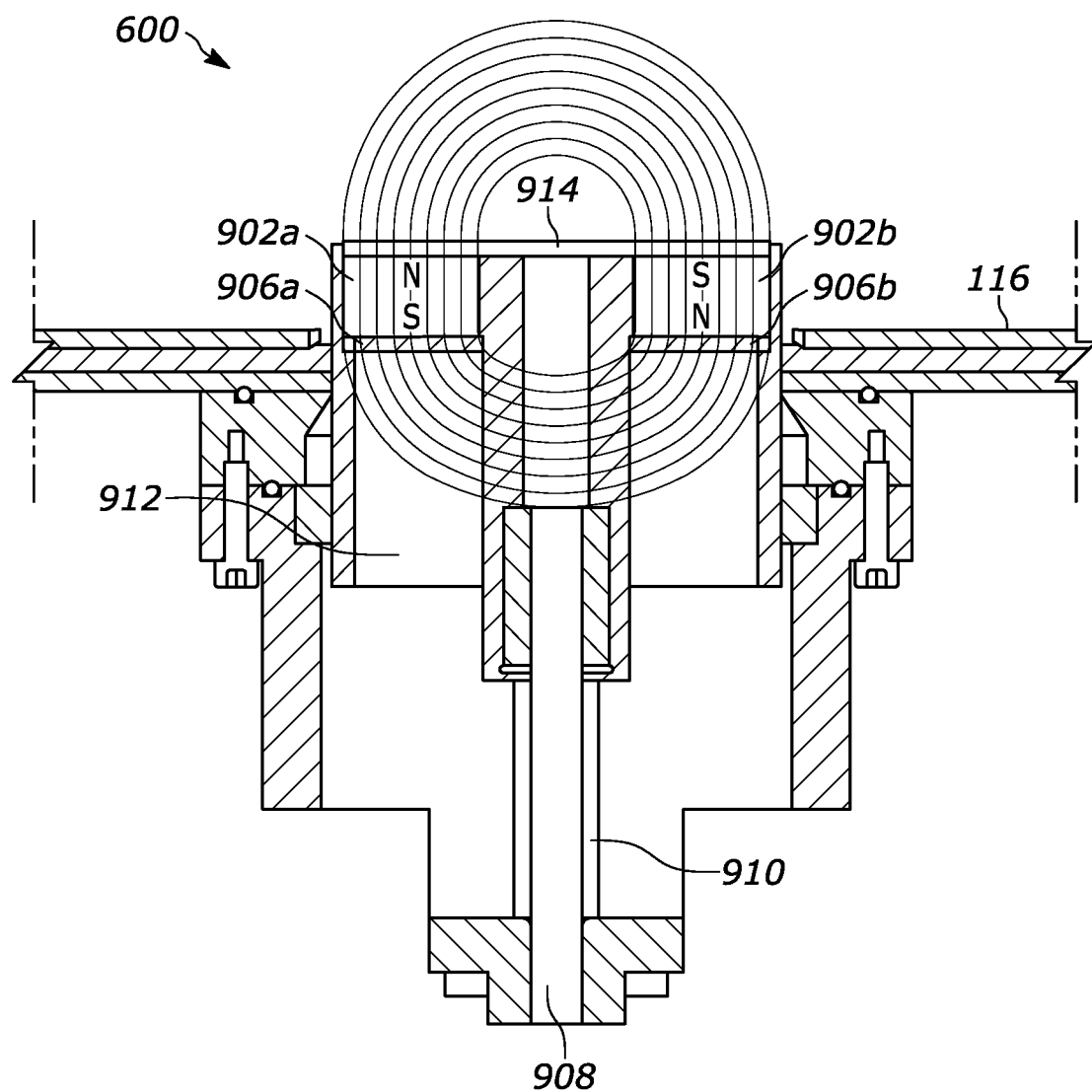
FIG. 10 is a cross-sectional view of a dual pole magnetic grasping element in accordance with certain embodiments of the invention.

Referring now to FIG. 10, in some embodiments, a grasping element 600 may include one or more magnets 902 configured to quickly and securely grasp a ferromagnetic component integrated into or coupled to dishware 106. For example, a grasping element 600 may comprise permanent and/or electromagnets 902 affixed to a movable housing 912 configured to move relative to the receiving surface 116. In certain embodiments, as shown, the grasping element 600 may include two permanent magnets 902a, 902b positioned with opposing poles facing outward from the receiving surface 116. The magnetic field created by this arrangement of magnets 902 may migrate ferromagnetic components of the dishware 106 to center relative to the two permanent magnets 902a, 902b.

In certain embodiments, the housing 912 may translate or rotate relative to the receiving surface 116, such that the magnets 902 may move towards the dishware 106 to engage the dishware 106, and away from the dishware 106 to disengage the dishware 106. In one embodiment, for example, the grasping element 600 may include magnets 902 on a rotating cylinder having a rotation axis parallel to the receiving surface 116, as shown in FIG. 9E. Alternatively, the rotating cylinder may have a rotation axis perpendicular to the receiving surface 116.

In certain embodiments, a grasping element 600 may include magnets 902 configured to move laterally on the receiving surface 116, shearing sideways. In other embodiments, magnets 902 may move normal to the receiving surface 116, in and out. For example, as shown, the housing 912 may move the magnets 902 out of the receiving surface 116 to engage the dishware 106 and retract into the receiving surface 116 to disengage the dishware 106 by moving away from its ferromagnetic component. This embodiment may be particularly advantageous since many types of dishware 106 have a recessed surface on their underside, with a variable depth. Extending the grasping element 600 out from the receiving surface 116 in this manner may achieve consistent engagement with dishware 106, despite variations in dishware recess depth.

In certain embodiments, the housing 912 may include a guide rod 908 and a linear bearing 910 to facilitate vertically transitioning the grasping element 600 between various positions relative to the receiving surface 116. In some embodiments, the guide rod 908 may be integrated into a central portion of the housing 912 to stabilize and support the grasping element 600 as it moves between vertical positions, and to further provide support to dishware 106 engaged with the grasping element 600. The linear bearing 910 may provide fluid movement of the grasping element 600 in transit between the various vertical positions.

In one embodiment, each of two permanent magnets 902a, 902b may include a backing plate 906a, 906b to focus a magnetic field. Upon engagement of the dishware 106 with the grasping element 600, the backing plates 906a, 906b may concentrate the magnetic field through the dishware 106 to attract and center the dishware 106 relative to the magnets 902a, 902b.

In some embodiments, a button cap 914 may be coupled to a top surface of the permanent magnets 902a, 902b to provide a smooth or slippery interface between the permanent magnets 902a, 902b and the dishware 106. This slippery interface may facilitate re-positioning and/or centering the dishware 106 with respect to the magnets 902a, 902b and/or receiving surface 116. Indeed, in certain embodiments, the slippery surface of the button cap 914 may allow the dishware 106 to slide laterally prior to being secured in place relative to the receiving surface 116. Other forces acting on the dishware 106, such as lateral streams of liquid at high pressure and/or application of a scrubber to the interior of the dishware 106, may also facilitate centering the dishware 106.

Movement of the grasping element 600 may be actuated using any actuation technology known to those in the art. For example, actuation may be accomplished via motors, hydraulics, pneumatics, electromagnetic actuators, electrostatic actuators, or the like. In some embodiments, extension or retraction of the housing 912 may be passive by implementing a spring or other biasing mechanism to bias the grasping element 600 toward a fully extended or retracted state.

Figure 11:
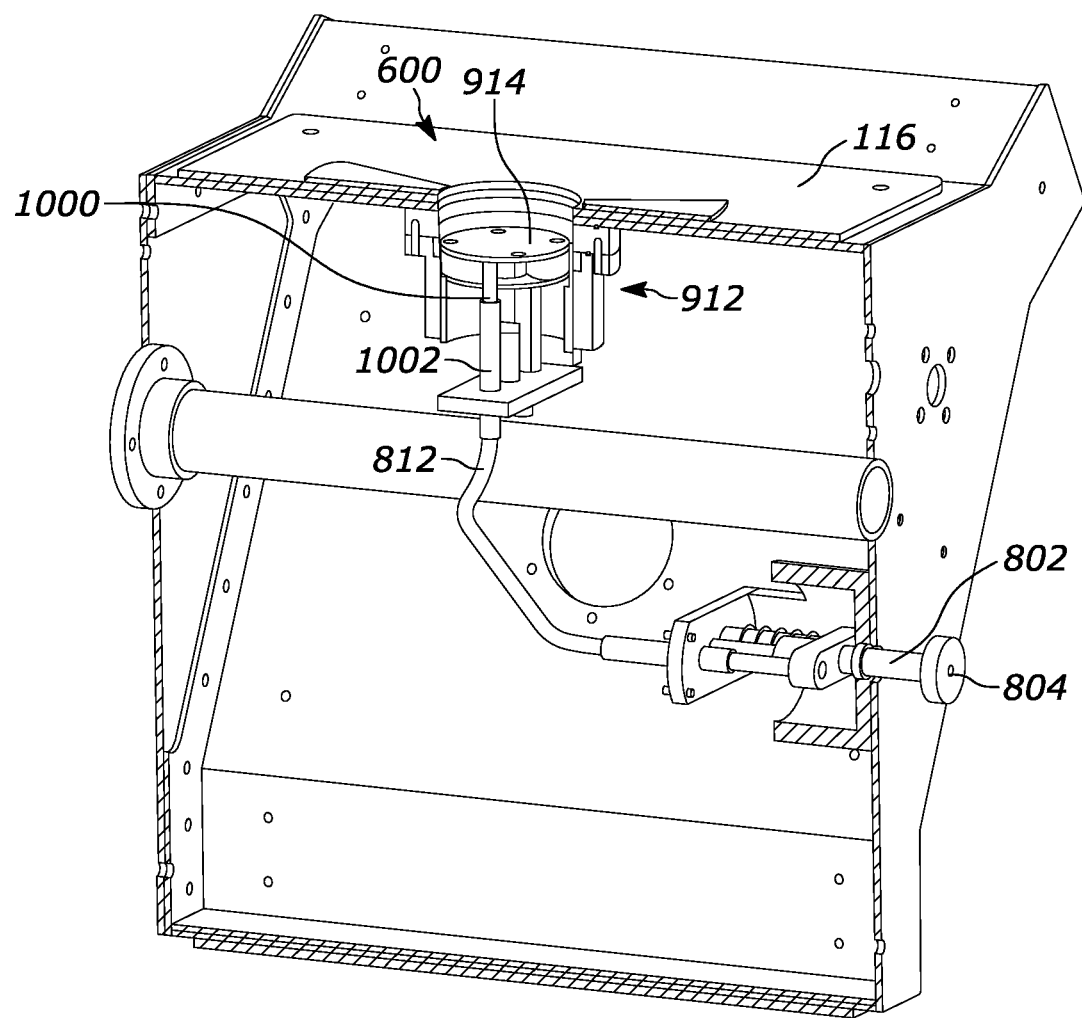
FIG. 11 is a cross-sectional view of a grasping element retracted from a receiving surface in accordance with one embodiment of the invention.
Figure 12:
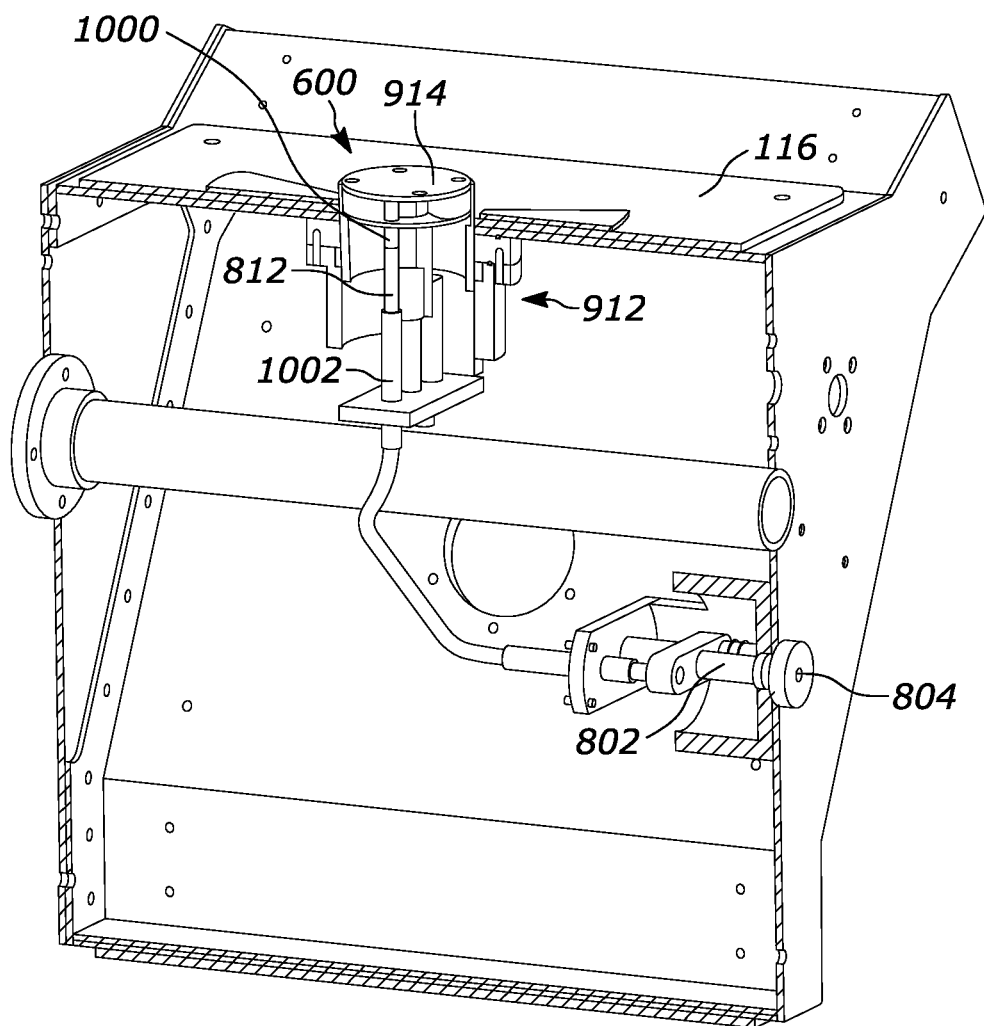
FIG. 12 is cross-sectional view of a grasping element extended from a receiving surface in accordance with another embodiment of the invention.

Referring now to FIGS. 11 and 12, in certain embodiments, actuation may be binary such that the grasping element 600 is controlled between fully extended and fully retracted states. In other embodiments, actuation may control movement of the grasping element 600 between multiple discrete states, such as fully retracted, partially retracted, partially extended, and fully extended. In still other embodiments, actuation may control movement of the grasping element 600 through a continuous range of states between fully retracted and fully extended states.

The push/pull cable 812 and anti-rotation rod 1000 may slide within a tube 1002 to facilitate movement of the push/pull cable 812 between various positions. In certain embodiments, the length of the tube 1002 may determine a maximum distance that the grasping element 600 may be retracted or extended relative to the receiving surface 116.

Figure 13A:
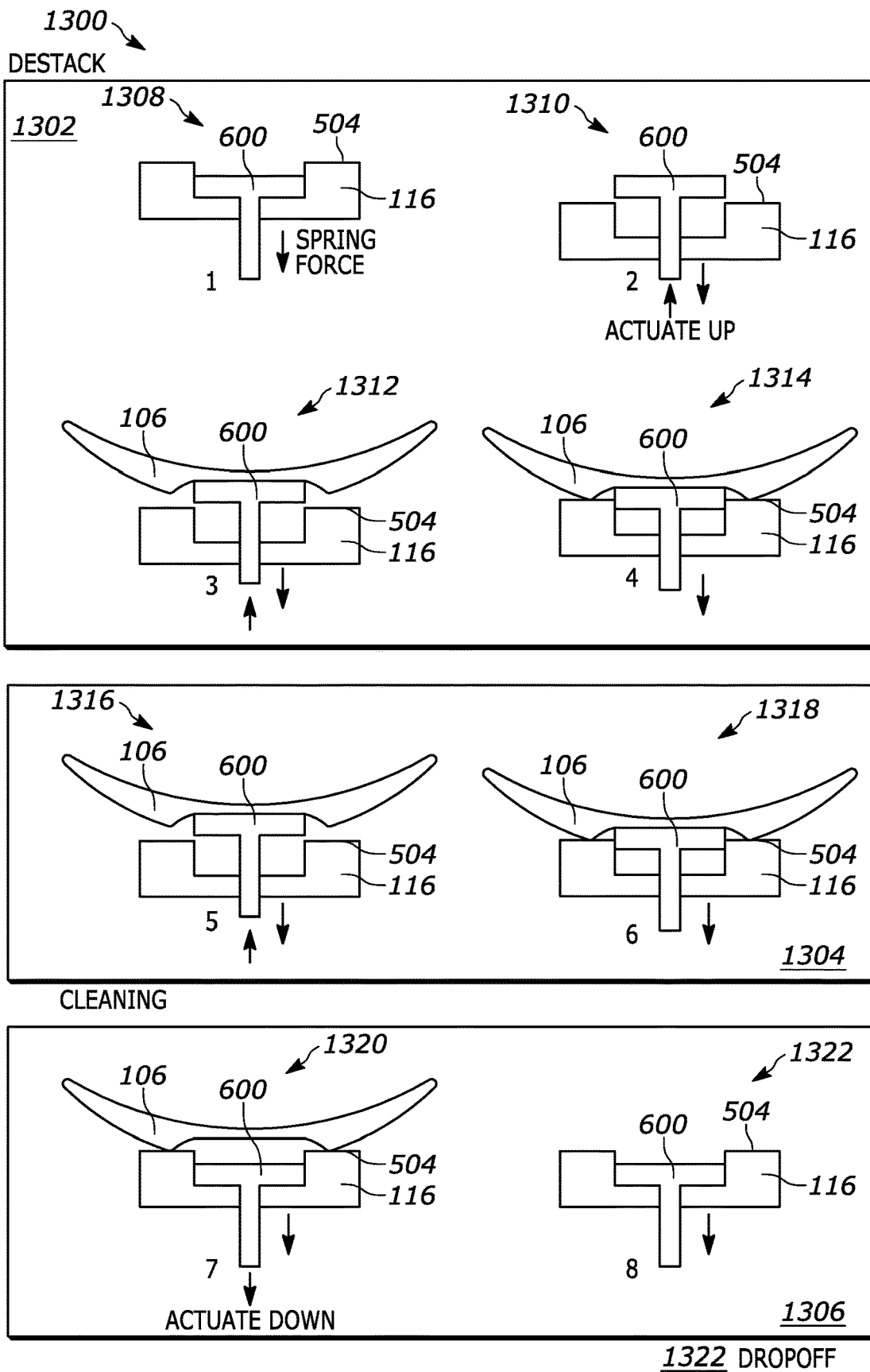
FIG. 13A is a schematic diagram of a process that a single magnetic grasping element may undergo during the rotation of a conveyance assembly through stages of a cleaning cycle in accordance with embodiments of the invention.

FIG. 13A illustrates exemplary steps in a process 1300 for grasping and retaining dishware 106 through a cleaning cycle in accordance with embodiments of the invention. For example, some embodiments of the invention may include an acquisition stage 1302 to load dishware 106 onto a conveyance assembly 102. A cleaning stage 1304 may then clean, and optionally dry, the dishware 106, after which the dishware 106 may be unloaded from the conveyance assembly 102 in an unloading stage 1306.

In certain embodiments, the acquisition stage 1302 may include four steps 1308, 1310, 1312, 1314. In the first step 1308, the grasping element 600 may be retained in a substantially neutral position relative to the receiving surface 116. In one embodiment, the grasping element 600 may be unpowered such that a spring or other biasing mechanism passively retains the grasping element 600 in this position relative to the receiving surface 116 by default. Alternatively, the grasping element 600 may be powered to assume this position.

In a second step 1310, the grasping element 600 may be actuated to vertically extend from the receiving surface 116. The magnetic field created by the grasping element 600 may thus attract ferromagnetic components of the dishware 106. In a third step 1312, the grasping element 600 may grasp and retain a ferromagnetic component of the dishware 106. In certain embodiments, the combination of the magnetic field generated by the grasping element 600 and its slippery surface may facilitate centering the dishware 106 relative to the grasping element 600.

In the fourth step 1314, the grasping element 600 may be retracted to pull the dishware 106 substantially against the receiving surface 116. In other embodiments, power may be removed from the grasping element 600 such that the grasping element 600 returns to a default position via a spring or other biasing mechanism, thereby pulling the attached dishware 106 substantially against the receiving surface 116. In some embodiments, the receiving surface 116 may include one or more anti-slip elements 504 to mediate contact between the dishware 106 and the receiving surface 116.

As shown, a cleaning stage 1304 may include two steps 1316, 1318. The first step 1316 may selectively translate the grasping element 600 to release the dishware 106 from the anti-slip element 504 and/or receiving surface 116 such that magnetic forces from the grasping element 600 and mechanical forces on the dishware 106 may re-position the dishware 106. For example, as previously discussed, some embodiments of the grasping element 600 may include two permanent magnets. The magnetic field generated by the magnets may migrate ferromagnetic components of the dishware 106 to center relative to the two magnets.

In other embodiments, streams of water or other fluid may be sprayed toward the dishware 106 at high pressures or flow rates, and/or a scrubber or other mechanical device may make contact with an interior of the dishware 106. Releasing the dishware 106 from the anti-slip element 504 and/or receiving surface 116 while maintaining attachment between the dishware 106 and the grasping element 600 in this manner may enable the dishware 106 to move laterally in response to such forces. In a second step 1318 of the cleaning stage 1316, the grasping element 600 may be actively or passively retracted such that the dishware 106 is securely re-positioned relative to the anti-slip element 504 and/or receiving surface 116.

An unloading stage 1306 may include selectively disengaging the dishware 106 from the grasping element 600. A first step 1320 of the unloading stage 1306 may include actuating the grasping element 600 to retract from the receiving surface 116 and thereby reduce the magnetic field between the grasping element 600 and the ferromagnetic components of the dishware 106. In this manner, the dishware 106 may be disengaged from the grasping element 600. Of course, in other embodiments, disengaging the dishware 106 may include changing a state of the grasping element 600 by rotating the grasping element 600, reversing a polarity thereof, or the like. In a second step 1322 of the unloading stage 1306, the dishware 106 may be removed from the receiving surface 116 by using gravity to shear off the dishware 106, mechanically prying the dishware 106 from the receiving surface 116, or by any other technique known to those in the art.

Figure 13B:
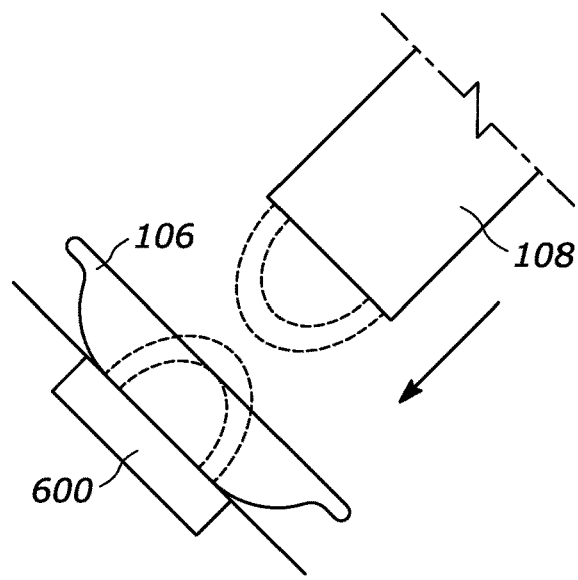
FIG. 13B is a side view of dishware being magnetically handed off from a grasping element to an end effector in accordance with the invention.
Figure 13C:
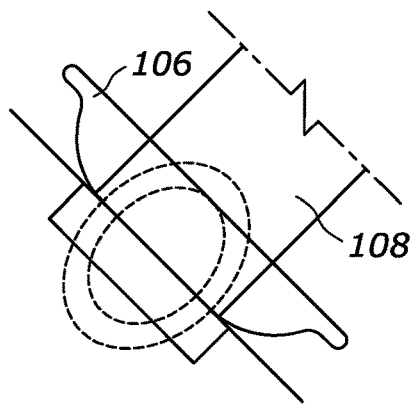
FIG. 13C is a side view of the dishware of FIG. 13B showing magnetic engagement between the grasping element and end effector.
Figure 13D:
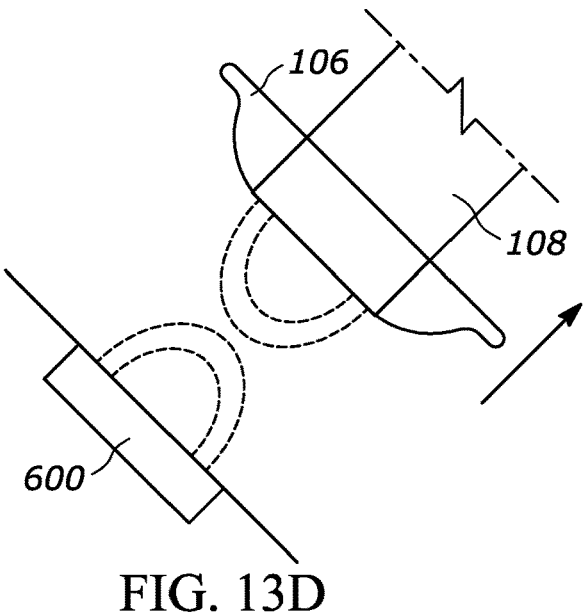
FIG. 13D is a side view of the dishware of FIG. 13B showing the end effector receiving the dishware.

In certain embodiments, as shown in FIGS. 13B-13D, removing the dishware 106 from the receiving surface 116 may include magnetically handing off the dishware 106 from the grasping element 600 to a magnetic end effector 108 of a robotic manipulator 104. Like the initial transfer of the dishware 106 onto the conveyance assembly 102 during the acquisition stage 1302, the dishware 106 must be disengaged from one magnetic element to enable it to be grasped by another magnetic element. In some embodiments, magnetic handoff may be facilitated by controlling a differential in magnetic attraction force to the dishware 106 between the end effector 108 and the grasping element 600. The dishware 106 may then attach to either the end effector 108 or the grasping element 600 depending on which exhibits higher magnetic attraction on the dishware 106.

This differential in magnetic force may be achieved in numerous ways. In embodiments utilizing electromagnets, the strength of the electromagnet may be modulated by modulating their electric current. Where permanent magnets are used, their output strength may be modulated by controlling the distance and/or orientation between the dishware 106 and the magnet.

If magnetic force is consistently stronger on either the end effector 108 or the grasping element 600 than the other, handoff will always occur from the weaker to the stronger of the two. In certain embodiments, at least one of the end effector 108 and the grasping element 600 may be modulated in output magnetic strength by translating or rotating a permanent magnet thereof relative to the dishware 106, or by controlling current through an electromagnet to either weaken its own output or to counteract the fields of an adjacent permanent magnet.

In one embodiment, for example, dishware 106 may be magnetically grasped by an end effector 108 of a robotic manipulator 104 and moved to a magnetic grasping element 600 of a conveyance assembly 102. The end effector 108 attached to the dishware 106 may approach and, in some embodiments, make contact with the grasping element 600. The magnetic attraction of the dishware 106 to the grasping element 600 may be made stronger than the magnetic attraction of the dishware 106 to the end effector 108 by, for example, reducing the magnetic attraction of the end effector 108 or increasing the magnetic attraction of the grasping element 600. In other embodiments, the magnetic attraction of the grasping element 600 may be constantly stronger than the magnetic attraction of the end effector 108 such that no controlled changes to magnetic attraction are needed. The dishware 106 may then be transferred from the end effector 108 to the grasping element 600. The robotic manipulator 104 may then move away from the dishware 106 on the grasping element 600.

This magnetic handoff process may be reversed to remove the dishware 106 from a grasping element 600 of the conveyance assembly 102. For example, as shown in FIG. 13B, dishware 106 may be grasped by the grasping element 600 on the conveyance assembly 102. A robotic manipulator 104 with a magnetic end effector 108 may approach and/or make contact with dishware 106 on the grasping element 600, as shown in FIG. 13C. The magnetic attraction of the dishware 106 to the end effector 108 may be made stronger than the magnetic attraction of the dishware 106 to the grasping element 600 to enable the end effector 108 to remove the dishware 106 therefrom, as shown in FIG. 13D.

As above, this may be accomplished in various ways. In one embodiment, the end effector 108 magnetic attraction may be increased. In another embodiment, the grasping element 600 magnetic attraction may be reduced. In still another embodiment, no controlled changes may be made to magnetic attraction. Rather, magnetic attraction of the grasping element 600 may be constantly weaker than the magnetic attraction of the end effector 108.

As shown in FIG. 13D, the dishware 106 may then be transferred from the grasping element 600 to the end effector 108. The robotic manipulator's 104 end effector 108 may then be moved away from the grasping element 600 with the dishware 106 attached.

Figure 14:
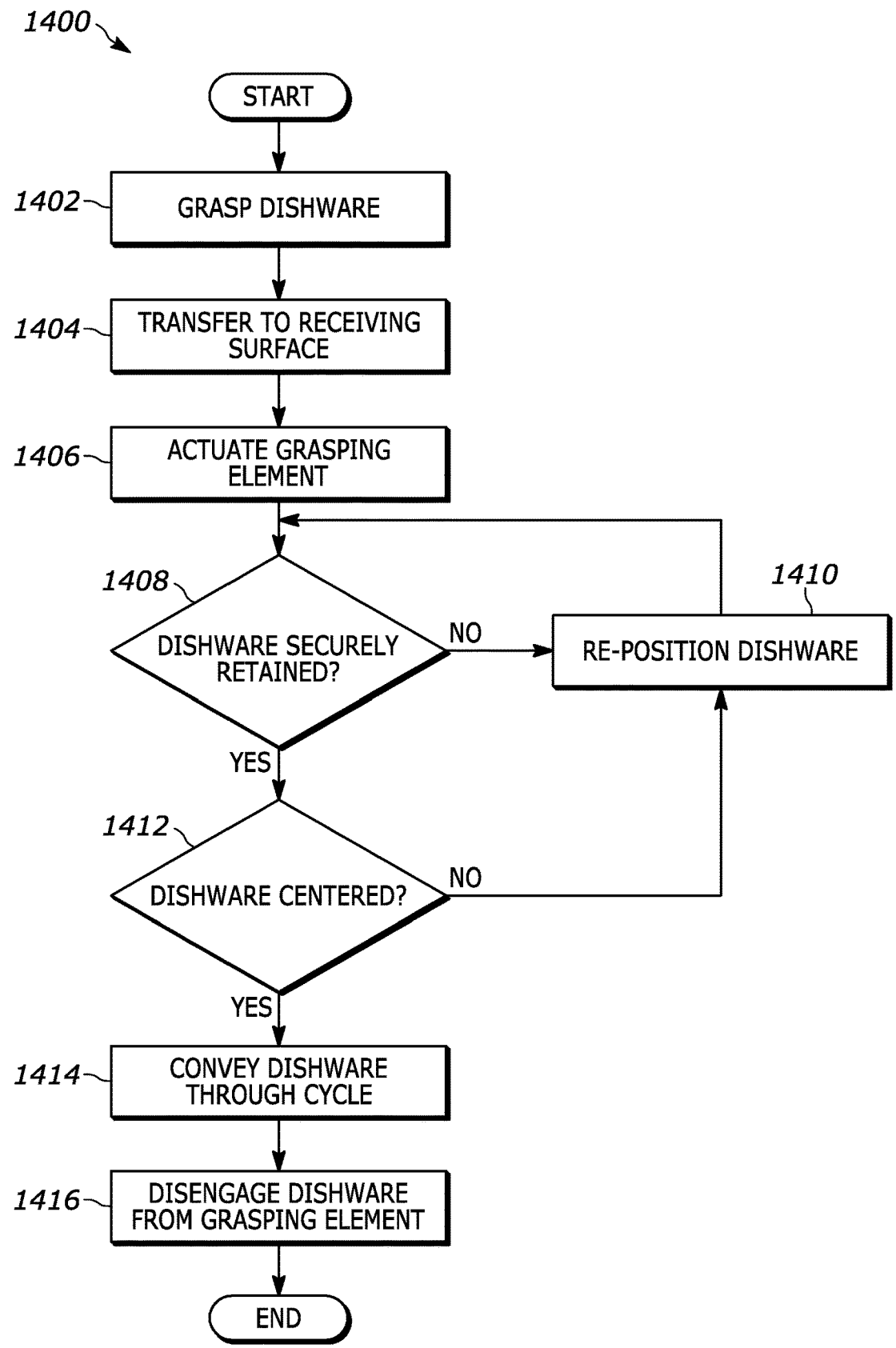
FIG. 14 is a flow chart illustrating a process for conveying dishware through a cycle in accordance with certain embodiments of the invention.

Referring now to FIG. 14, a method 1400 for conveying dishware 106 through a cleaning cycle in accordance with embodiments of the invention may include grasping 1402 dishware from a location, such as conveyance belt or stack. In some embodiments, a robotic manipulator may utilize an end effector to grasp the dishware, as discussed above.

The dishware may then be transferred 1404 to a receiving surface. The receiving surface may be included on a conveyance assembly or wheel, and may include a grasping element. The grasping element may be actuated 1406 to grasp and retrieve the dishware from the end effector of the robotic manipulator. In certain embodiments, both the end effector of the robotic manipulator and the grasping element of the conveyance assembly may be magnetic. Accordingly, in some embodiments, either the end effector or the grasping element may reduce or increase its magnetic field to effectuate hand off of the dishware to the other. In certain embodiments, no controlled changes may be made to magnetic attraction of the grasping element or end effector. Rather, magnetic attraction of one may be constantly weaker or stronger than the magnetic attraction of the other.

After handoff to the grasping element, the method 1400 may query whether the dishware is securely retained 1408 and centered 1412 relative to the grasping element. In certain embodiments, sensors may be used to make this determination. If not, the dishware may be repositioned 1410 by, for example, changing a state of the grasping element to temporarily disengage the dishware from the receiving surface and allow magnetic and/or mechanical forces to move the dishware laterally with respect to the grasping element. The method 1400 may then return to query whether the dishware is securely retained and centered relative to the grasping element. If yes to both 1408, 1412, the dishware 106 may be conveyed 1414 through each stage of a cleaning cycle.

Upon completion of the cleaning cycle, or at any other desired point in the process, the method 1400 may disengage 1416 the dishware from the grasping element by actively or passively changing a state of the grasping element, as discussed in detail above. In some embodiments, gravity acting on the dishware may shear the dishware from the receiving surface. In other embodiments, a mechanical feature onboard or offboard the conveyance assembly may pry the dishware from the grasping element and receiving surface. In certain embodiments, an end effector of a robotic manipulator may then grasp the dishware and move it to a new location.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A system for grasping and retaining dishware during a cleaning cycle, comprising:
    a grasping element for grasping dishware, wherein the grasping element grasps the dishware utilizing powered vacuum suction; and
    a receiving surface substantially adjacent to the grasping element for receiving and retaining the dishware via a vacuum supplied by the grasping element during at least one stage of a cleaning cycle, wherein the receiving surface rotates about an axis to convey the dishware to each of at least two unique locations.

2. The system of claim 1, wherein the grasping element comprises a mechanical element selected from the group consisting of a hook, a cage, a basket, a groove, and a slot.

3. The system of claim 2, wherein the grasping element selectively grasps and disengages the dishware based on a direction of gravity as the receiving surface rotates about the axis.

4. The system of claim 1, wherein a point of contact offboard the receiving surface disengages the dishware from the grasping element.

5. The system of claim 1, wherein the grasping element comprises an articulating mechanism to actively grasp the dishware.

6. The system of claim 5, wherein the articulating mechanism is selected from the group consisting of fingers, claws, pincers, and a prismatic gripper.

7. The system of claim 5, wherein the articulating mechanism responds to a changing direction of gravity as the receiving surface rotates about the axis.

8. The system of claim 5, wherein the articulating mechanism responds to at least one of a dishware attachment force, an insertion force, and a presence of the dishware on the receiving surface.

9. The system of claim 5, wherein a point of contact offboard the receiving surface actuates the articulating mechanism upon contact therewith.

10. The system of claim 1, wherein the grasping element is controlled by at least one of an actuator and a transmission element.

11. The system of claim 10, wherein the actuator is offboard the receiving surface and wherein the transmission element is onboard the receiving surface.

12. A method for grasping and retaining dishware during a cleaning cycle, comprising:
    actuating a grasping element to grasp dishware, wherein the grasping element comprises a powered vacuum suction element;
    selectively retaining the dishware adjacent to a receiving surface associated with the grasping element via a vacuum supplied by the powered vacuum suction element; and
    rotating the receiving surface about an axis to convey the dishware to each of at least two unique locations.

13. The method of claim 12, wherein actuating the grasping element comprises selectively actuating the grasping element based on a direction of gravity as the receiving surface rotates about the axis.

14. The method of claim 12, wherein actuating the grasping element comprises rotating the receiving surface about the axis such that a point of contact offboard the receiving surface contacts at least one of the grasping element, the dishware, and the receiving surface to actuate the grasping element.

15. The method of claim 12, wherein actuating the grasping element further comprises actuating at least one of an actuator and a transmission element associated with the grasping element.

16. The method of claim 15, wherein the actuator is offboard a conveyance assembly and the transmission element is onboard the conveyance assembly.

17. The method of claim 12, wherein actuating the grasping element comprises actuating the grasping element in response to at least one of a dishware attachment force, an insertion force, and a presence of the dishware on the receiving surface.

18. The method of claim 12, further comprising disengaging the dishware from the grasping element upon contact between a point of contact offboard the receiving surface and at least one of the grasping element, the dishware, and the receiving surface.

* * * * *